United States Patent
Matsumoto et al.

(10) Patent No.: US 9,453,451 B2
(45) Date of Patent: Sep. 27, 2016

(54) ABNORMALITY DIAGNOSIS APPARATUS FOR EXHAUST GAS PURIFICATION APPARATUS

(71) Applicant: TOYOTA JIDOSHA KABUSHIKI KAISHA, Toyota-shi, Aichi (JP)

(72) Inventors: Arifumi Matsumoto, Gotenba (JP); Tomoyuki Kogo, Gotenba (JP); Taiga Hagimoto, Susono (JP); Kenji Furui, Susono (JP); Akifumi Uozumi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/916,611

(22) PCT Filed: Sep. 24, 2014

(86) PCT No.: PCT/JP2014/075324
§ 371 (c)(1),
(2) Date: Mar. 4, 2016

(87) PCT Pub. No.: WO2015/046273
PCT Pub. Date: Apr. 2, 2015

(65) Prior Publication Data
US 2016/0201541 A1    Jul. 14, 2016

(30) Foreign Application Priority Data

Sep. 25, 2013 (JP) .................... 2013-198767

(51) Int. Cl.
*B01D 50/00* (2006.01)
*F01N 11/00* (2006.01)
*F01N 3/20* (2006.01)

(52) U.S. Cl.
CPC ........... *F01N 11/007* (2013.01); *F01N 3/2066* (2013.01); *F01N 2550/02* (2013.01); *F01N 2610/02* (2013.01)

(58) Field of Classification Search
CPC ............. F01N 3/2066; F01N 2550/00; F01N 2610/02; F01N 2900/1616; Y02T 10/47
USPC ............... 422/169, 50, 83; 60/274, 276, 286
See application file for complete search history.

(56) References Cited

U.S. PATENT DOCUMENTS 6,662,553 B2 * 12/2003 Patchett ................. B01D 53/90
                                                   60/274
6,701,707 B1 * 3/2004 Upadhyay ............... F01N 3/208
                                                   60/276

(Continued)

FOREIGN PATENT DOCUMENTS

EP        2 400 124 A1    12/2011
JP        2011-94540      5/2011

(Continued)

*Primary Examiner* — Tom P Duong
(74) *Attorney, Agent, or Firm* — Finnegan, Henderson, Farabow, Garrett & Dunner, LLP

(57) ABSTRACT

An abnormality diagnosis apparatus for an exhaust gas purification apparatus including a selective catalytic reduction NOx catalyst (SCR catalyst) and a sensor which detects NOx and ammonia in exhaust gas flowing out from the NOx catalyst and at which NOx and ammonia react with each other. The abnormality diagnosis apparatus calculates, based on concentrations of NOx and ammonia which flow out from the SCR catalyst, an amount of decline in output of the sensor due to a reaction between NOx and ammonia at the sensor, and performs an abnormality diagnosis of the SCR catalyst based on the calculated amount of decline in output of the sensor.

15 Claims, 11 Drawing Sheets

(56) References Cited

U.S. PATENT DOCUMENTS

| | | | |
|---|---|---|---|
| 7,610,750 B2* | 11/2009 | Viola | F01N 3/035 60/277 |
| 7,886,527 B2* | 2/2011 | Solbrig | F01N 3/106 60/274 |
| 2006/0010857 A1* | 1/2006 | Hu | F01N 13/011 60/286 |
| 2007/0175208 A1* | 8/2007 | Bandl-Konrad | B01D 53/9431 60/286 |
| 2007/0199309 A1 | 8/2007 | Yano et al. | |
| 2011/0099977 A1 | 5/2011 | Takahashi | |
| 2012/0174562 A1 | 7/2012 | Itoh | |

FOREIGN PATENT DOCUMENTS

| | | |
|---|---|---|
| WO | WO 2006/046339 A1 | 5/2006 |
| WO | WO 2010/095221 A1 | 8/2010 |
| WO | WO 2011/033620 A1 | 3/2011 |

\* cited by examiner

ABNORMALITY DIAGNOSIS APPARATUS FOR EXHAUST GAS PURIFICATION APPARATUS

CROSS-REFERENCE TO RELATED APPLICATIONS

This application is a national phase application of International Application No. PCT/JP2014/075324, filed Sep. 24, 2014, and claims the priority of Japanese Application No. 2013-198767, filed Sep. 25, 2013, the content of both of which is incorporated herein by reference.

TECHNICAL FIELD

The present invention relates to an abnormality diagnosis apparatus for an exhaust gas purification apparatus.

BACKGROUND ART

A selective catalytic reduction NOx catalyst (hereinafter, simply referred to as a "NOx catalyst") is known which uses ammonia as a reducing agent to purify NOx contained in exhaust gas from an internal combustion engine. Ammonia or an ammonia precursor (for example, urea) is supplied to exhaust gas on an upstream side of the NOx catalyst. In addition, when determining whether or not purification of NOx at the NOx catalyst is normally performed or when determining whether or not the NOx catalyst is in a normal state, an output value of a NOx sensor provided on a downstream side of the NOx catalyst is sometimes used.

It is known that, when the output value of the NOx sensor provided on the downstream side of the NOx catalyst shows a downward trend regardless of an increase in an amount of NOx flowing into the NOx catalyst, a determination is made that an ammonia slip in which ammonia flows out from the NOx catalyst has occurred and a supply amount of ammonia is excessive (for example, refer to PTL 1).

Moreover, since the NOx sensor detects ammonia as well as NOx, the output value of the NOx sensor is a value in accordance with a NOx concentration and an ammonia concentration in exhaust gas. Therefore, in a known technique, detection of NOx by a NOx sensor is stopped in consideration of the fact that detection accuracy of the NOx sensor declines when ammonia is being added (for example, refer to PTL 2).

In another known technique, two NOx catalysts are provided in series and ammonia is supplied to an upstream side NOx catalyst so that an ammonia concentration between the upstream side NOx catalyst and a downstream side NOx catalyst equals a prescribed concentration (for example, refer to PTL 3).

Moreover, as a NOx catalyst deteriorates, ammonia adsorption performance of the NOx catalyst declines. Further, as an amount of ammonia adsorbed by the NOx catalyst decreases due to a decline in its ammonia adsorption performance, NOx purification performance declines. In addition, due to the decline in ammonia adsorption performance, an amount of ammonia that flows out from the NOx catalyst increases when ammonia is supplied to the NOx catalyst. Accordingly, in a known technique, a determination is made that a NOx catalyst has deteriorated when a difference between an actually-measured value and an estimated value of an ammonia concentration on a downstream side of the NOx catalyst is equal to or larger than a prescribed value (for example, refer to PTL 4).

[column 2]

CITATION LIST

Patent Literature

PTL 1: Japanese Patent Application Laid-open No. 2011-094540
PTL 2: WO 2011/033620
PTL 3: WO 2010/095221
PTL 4: WO 2006/046339

SUMMARY OF INVENTION

Technical Problem

When NOx and ammonia are present in exhaust gas flowing into a NOx sensor, the NOx is reduced by the ammonia at the NOx sensor. The NOx includes NOx contained in exhaust gas on an upstream side of the NOx sensor as well as NOx created by oxidation of ammonia at the NOx sensor. In addition, due to a reaction between NOx and ammonia at the NOx sensor, both NOx and ammonia decreases. An output value of the NOx sensor is a value in accordance with NOx and ammonia that remain after the decrease in NOx and ammonia. Therefore, the output value of a NOx sensor when the NOx sensor is provided on a downstream side of a NOx catalyst may end up being lower than concentrations of NOx and ammonia which flow out from the NOx catalyst.

As a result, there is a risk that diagnostic accuracy of an abnormality diagnosis of the NOx catalyst may decline if the abnormality diagnosis is performed based on the output value of the NOx sensor when NOx and ammonia are present in exhaust gas.

The present invention has been made in consideration of the problems described above and an object thereof is to prevent an erroneous diagnosis in an abnormality diagnosis of a selective catalytic reduction NOx catalyst.

Solution to Problem

In order to solve the problem described above, the present invention provides an abnormality diagnosis apparatus for an exhaust gas purification apparatus of an internal combustion engine, the exhaust gas purification apparatus including:

a selective catalytic reduction NOx catalyst which is provided in an exhaust passage of the internal combustion engine and which uses ammonia as a reducing agent;

a supplying unit which supplies ammonia or an ammonia precursor into exhaust gas that flows into the selective catalytic reduction NOx catalyst on an upstream side of the selective catalytic reduction NOx catalyst; and a sensor which is provided on a downstream side of the selective catalytic reduction NOx catalyst, which detects NOx and ammonia in exhaust gas flowing out from the selective catalytic reduction NOx catalyst, and at which NOx and ammonia react with each other, the abnormality diagnosis apparatus for the exhaust gas purification apparatus including:

a NOx concentration estimating unit which estimates a NOx concentration in the exhaust gas flowing out from the selective catalytic reduction NOx catalyst;

an ammonia concentration estimating unit which estimates an ammonia concentration in the exhaust gas flowing out from the selective catalytic reduction NOx catalyst;

a calculating unit which calculates an amount of decline in output of the sensor due to a reaction between NOx and ammonia at the sensor, based on the NOx concentration estimated by the NOx concentration estimating unit and the ammonia concentration estimated by the ammonia concentration estimating unit;

a diagnosing unit which performs a diagnosis of the selective catalytic reduction NOx catalyst based on an output value of the sensor; and a diagnosis control unit which controls a diagnosis by the diagnosing unit based on the amount of decline in output of the sensor as calculated by the calculating unit.

A NOx catalyst adsorbs ammonia in exhaust gas and uses the ammonia as a reducing agent to selectively reduce NOx. A supply apparatus supplies ammonia or an ammonia precursor (for example, urea). Ammonia flowing into the NOx catalyst is, for example, adsorbed by the NOx catalyst.

In this case, a sensor that detects NOx in exhaust gas flowing out from the NOx catalyst is provided on a downstream side of the NOx catalyst. The sensor receives interference from ammonia. In other words, the sensor characteristically also detects ammonia as NOx when ammonia is contained in exhaust gas. Therefore, an output value of the sensor is dependent on NOx and ammonia contained in exhaust gas. In addition, a diagnosing unit performs an abnormality diagnosis of the NOx catalyst using the output value of the sensor. An abnormality refers to a state where, for example, an ammonia adsorption performance or a NOx purification rate of the NOx catalyst falls below an allowable range. Alternatively, an abnormality of the NOx catalyst may be determined when a degree of deterioration exceeds an allowable range.

When a NOx catalyst deteriorates, due to a decline in an ammonia adsorption performance or a NOx purification rate, NOx and ammonia may flow out from the NOx catalyst. Therefore, when large amounts of NOx and ammonia flow out from the NOx catalyst, it can be diagnosed that an abnormality has occurred in the NOx catalyst. The NOx and the ammonia are detected by a sensor provided on a downstream side of the NOx catalyst. However, since NOx and ammonia react with each other at the sensor, the NOx and the ammonia decrease and, consequently, output of the sensor declines. Therefore, concentrations of NOx and ammonia detected by the sensor become lower than actual concentrations of NOx and ammonia. In this case, a NOx purification rate calculated based on an output value of the sensor apparently rises. When an abnormality diagnosis is performed in such a state based on the output value of the sensor or on the NOx purification rate calculated based on the output value of the sensor, there is a risk that an incorrect diagnosis may be made.

In consideration thereof, a diagnosis control unit controls diagnosis by the diagnosing unit based on an amount of decline in output of the sensor. In this case, the amount of decline in output of the sensor is related to concentrations of NOx and ammonia which flow out from the NOx catalyst. Therefore, the amount of decline in output of the sensor can be obtained based on the concentrations of NOx and ammonia which flow out from the NOx catalyst. In addition, once the amount of decline in output of the sensor is known, a threshold or various values used when performing an abnormality diagnosis can be corrected based on the amount of decline in output. In addition, whether or not an abnormality diagnosis is to be performed can be determined based on the amount of decline in output of the sensor. Accordingly, the accuracy of abnormality diagnosis of the NOx catalyst can be improved. Moreover, controlling a diagnosis by the diagnosing unit includes correcting a threshold, correcting a sensor output value, correcting a NOx purification rate calculated based on a sensor output value, and determining whether or not a diagnosis is to be performed.

In addition, the diagnosis control unit may:

perform an abnormality diagnosis of the selective catalytic reduction NOx catalyst when an amount of rise of a NOx purification rate calculated based on an amount of decline in output of the sensor as calculated by the calculating unit is equal to or smaller than a prescribed amount; and not perform an abnormality diagnosis of the selective catalytic reduction NOx catalyst when the amount of rise of the NOx purification rate calculated based on the amount of decline in output of the sensor as calculated by the calculating unit is larger than the prescribed amount.

A NOx purification rate is a ratio of a NOx concentration that decreases due to purification by a NOx catalyst with respect to a NOx concentration in exhaust gas that flows into the NOx catalyst. For example, a NOx concentration in exhaust gas that flows into the NOx catalyst can be estimated based on an operating state of the internal combustion engine or can be detected by attaching a NOx sensor or the like on an upstream side of the NOx catalyst. In addition, a NOx concentration that decreases due to purification by the NOx catalyst can be obtained by subtracting a NOx concentration detected by a sensor provided on a downstream side of the NOx catalyst from the NOx concentration in exhaust gas that flows into the NOx catalyst. Since the sensor is influenced by ammonia, a NOx purification rate that is calculated based on an output value of the sensor is also influenced by ammonia. In addition, as the output value of the sensor declines due to the influence of NOx and ammonia contained in exhaust gas, the calculated NOx purification rate rises.

Since concentrations of NOx and ammonia which flow out from the NOx catalyst increase depending on the operating state of the internal combustion engine, the amount of decline in output of the sensor as calculated by the calculating unit increases. When the amount of decline in output of the sensor is large, an amount of rise of the NOx purification rate calculated based on an output value of the sensor increases and, accordingly, the calculated NOx purification rate increases even when the NOx catalyst is in an abnormal state. Therefore, since a difference between NOx purification rates calculated in an abnormal state and in a normal state of the NOx catalyst decreases, an accuracy of an abnormality diagnosis of the NOx catalyst based on the NOx purification rate may decline. In addition, as described later, when a threshold or the like is changed based on the amount of rise of the NOx purification rate, the larger the amount of rise of the NOx purification rate, the larger the amount of change of the threshold. Furthermore, the larger the amount of rise of the NOx purification rate, the closer the threshold approaches the NOx purification rate when the NOx catalyst is in a normal state. Therefore, there is a risk that the NOx purification rate may fall below the threshold and that the NOx catalyst is diagnosed to be in an abnormal state despite the NOx catalyst being in a normal state. In such a case, an accuracy of an abnormality diagnosis of the NOx catalyst can be prevented from declining by not performing the abnormality diagnosis. Moreover, the prescribed amount is determined so that an accuracy of an abnormality diagnosis is within an allowable range. Not performing an abnormality diagnosis includes, for example, reading an output value of the sensor but not performing an abnormality diagnosis using the output value. In addition, not performing an abnormality diagnosis includes, for example, performing an abnormality diagnosis based on the output value of the sensor but canceling a result of the diagnosis. Furthermore, not performing an abnormality diagnosis includes, for example, not reading the output value of the sensor.

In addition, the diagnosing unit may:

diagnose that the selective catalytic reduction NOx catalyst is in a normal state when a NOx purification rate calculated based on an output value of the sensor is equal to or higher than a threshold; and diagnose that the selective catalytic reduction NOx catalyst is in an abnormal state when the NOx purification rate calculated based on the output value of the sensor is lower than the threshold, and the diagnosis control unit may correct the threshold or the NOx purification rate based on an amount of decline in output of the sensor as calculated by the calculating unit.

In other words, the diagnosing unit performs an abnormality diagnosis of a NOx catalyst by comparing a NOx purification rate calculated based on an output value of the sensor with a threshold. In this case, the output value of the sensor is lower than actual concentrations of NOx and ammonia which flow out from the NOx catalyst. In addition, since the calculated NOx purification rate rises due to the decline in the output value of the sensor, the calculated NOx purification rate may become higher than the threshold despite the NOx catalyst being in an abnormal state. In contrast, by correcting the threshold or the NOx purification rate based on the amount of decline in output of the sensor, the NOx purification rate can be prevented from becoming higher than the threshold despite the NOx catalyst being in an abnormal state. Moreover, the threshold is set as a lower limit value of the NOx purification rate when the NOx catalyst is in a normal state.

In addition, the diagnosis control unit can correct the threshold by adding an amount of rise of a NOx purification rate calculated based on the amount of decline in output to the threshold.

In other words, by increasing the threshold by an amount of rise of the NOx purification rate, the NOx purification rate can be prevented from becoming higher than the threshold despite the NOx catalyst being in an abnormal state. Alternatively, the threshold can be corrected by multiplying the threshold by a correction coefficient based on the amount of rise of the NOx purification rate.

In addition, the diagnosis control unit can correct a NOx purification rate calculated based on an output value of the sensor by subtracting an amount of rise of the NOx purification rate calculated based on the amount of decline in output from the NOx purification rate.

In other words, by reducing the NOx purification rate by an amount of rise of the NOx purification rate, the NOx purification rate can be prevented from becoming higher than the threshold despite the NOx catalyst being in an abnormal state. Alternatively, the NOx purification rate can be corrected by multiplying the NOx purification rate by a correction coefficient based on the amount of rise of the NOx purification rate.

In addition, the NOx concentration estimating unit may estimate a NOx concentration in exhaust gas that flows out from the selective catalytic reduction NOx catalyst when assuming that the selective catalytic reduction NOx catalyst is in an abnormal state, the ammonia concentration estimating unit may estimate an ammonia concentration in the exhaust gas that flows out from the selective catalytic reduction NOx catalyst when assuming that the selective catalytic reduction NOx catalyst is in an abnormal state, the calculating unit may calculate the amount of decline in output when assuming that the selective catalytic reduction NOx catalyst is in an abnormal state based on the NOx concentration and the ammonia concentration in the exhaust gas that flows out from the selective catalytic reduction NOx catalyst when assuming that the selective catalytic reduction NOx catalyst is in an abnormal state, and the diagnosis control unit can correct the threshold by adding, to the threshold, an amount of rise of a NOx purification rate calculated based on the amount of decline in output when assuming that the selective catalytic reduction NOx catalyst is in an abnormal state.

Since concentrations of NOx and ammonia in exhaust gas that flows out from the NOx catalyst are higher when the NOx catalyst is in an abnormal state than when the NOx catalyst is in a normal state, an amount of decline in output of the sensor increases. In this case, assuming a state where the amount of decline in output of the sensor increases, the amount of decline in output of the sensor is calculated and, subsequently, an amount of rise of a NOx purification rate is calculated. By correcting the threshold based on the amount of rise of the NOx purification rate calculated in this manner, the NOx purification rate can be prevented from becoming equal to or higher than the threshold even if the NOx purification rate rises significantly when the NOx catalyst is actually in an abnormal state. Accordingly, it can be diagnosed that the NOx catalyst is in an abnormal state. Alternatively, the calculating unit may calculate the amount of rise of the NOx purification rate when assuming that the NOx catalyst is in a prescribed state of deterioration. Moreover, instead of correcting the threshold by adding the amount of rise of the NOx purification rate to the threshold, the NOx purification rate may be corrected by subtracting the amount of rise of the NOx purification rate from the NOx purification rate. Furthermore, the threshold or the NOx purification rate may be corrected by multiplying the threshold or the NOx purification rate by a correction coefficient.

In addition, the NOx concentration estimating unit can estimate a NOx concentration in exhaust gas that flows out from the selective catalytic reduction NOx catalyst when assuming that the selective catalytic reduction NOx catalyst is in a normal state, and a NOx concentration in exhaust gas that flows out from the selective catalytic reduction NOx catalyst when assuming that the selective catalytic reduction NOx catalyst is in an abnormal state, the ammonia concentration estimating unit can estimate an ammonia concentration in the exhaust gas that flows out from the selective catalytic reduction NOx catalyst when assuming that the selective catalytic reduction NOx catalyst is in a normal state, and an ammonia concentration in the exhaust gas that flows out from the selective catalytic reduction NOx catalyst when assuming that the selective catalytic reduction NOx catalyst is in an abnormal state, the calculating unit can calculate the amount of decline in output when assuming that the selective catalytic reduction NOx catalyst is in a normal state based on the NOx concentration and the ammonia concentration in the exhaust gas that flows out from the selective catalytic reduction NOx catalyst when assuming that the selective catalytic reduction NOx catalyst is in a normal state and, at the same time, can calculate the amount of decline in output when assuming that the selective catalytic reduction NOx catalyst is in an abnormal state based on the NOx concentration and the ammonia concentration in the exhaust gas that flows out from the selective catalytic reduction NOx catalyst when assuming that the selective catalytic reduction NOx catalyst is in an abnormal state, and the diagnosis control unit can correct the threshold by adding, to the threshold, a value which is equal to or larger than an amount of rise of a NOx purification rate calculated based on the amount of decline in output when assuming that the selective catalytic reduction NOx catalyst is in an abnormal state and, at the same time, which is equal to or smaller than a sum value of the amount of rise of the NOx purification rate calculated based on the amount of decline in output when assuming that the selective catalytic reduction NOx catalyst is in an abnormal state and the amount of rise of the NOx purification rate calculated based on the amount of decline in output when assuming that the selective catalytic reduction NOx catalyst is in a normal state.

Even when the NOx catalyst is in a normal state, NOx and ammonia may flow out from the NOx catalyst. However, a decline in an output of the sensor is more prominent when the NOx catalyst is in an abnormal state than when the NOx catalyst is in a normal state. In addition, since a decline in sensor output in both a normal state and an abnormal state of the NOx catalyst can be taken into consideration by further considering an amount of rise of a NOx purification rate that is calculated based on an amount of decline in output of the sensor when assuming that the NOx catalyst is in a normal state, an accuracy of abnormality diagnosis can be increased. Moreover, the calculating unit may respectively calculate the amount of rise of the NOx purification rate when assuming that the NOx catalyst is in a prescribed state of deterioration for a case where the NOx catalyst is in a normal state and for a case where the NOx catalyst is in an abnormal state.

In addition, the diagnosis control unit may:

perform an abnormality diagnosis of the selective catalytic reduction NOx catalyst when an amount of decline in output of the sensor as calculated by the calculating unit is equal to or smaller than a prescribed amount; and not perform an abnormality diagnosis of the selective catalytic reduction NOx catalyst when the amount of decline in output of the sensor as calculated by the calculating unit is larger than the prescribed amount.

Since concentrations of NOx and ammonia which flow out from the NOx catalyst increase depending on the operating state of the internal combustion engine, the amount of decline in output of the sensor as calculated by the calculating unit increases. In addition, when the amount of decline in output of the sensor is large, an actual output value of the sensor decreases even if the NOx catalyst is in an abnormal state. Therefore, since a difference between actual output values of the sensor between an abnormal state and a normal state of the NOx catalyst decreases, an accuracy of an abnormality diagnosis of the NOx catalyst based on an output value of the sensor may decline. In addition, as described later, when a threshold or the like is changed based on the amount of decline in output of the sensor, the larger the amount of decline in output of the sensor, the larger the amount of change of the threshold. Furthermore, the larger the amount of decline in output of the sensor, the closer the threshold approaches the output value of the sensor when the NOx catalyst is in a normal state. Therefore, there is a risk that the NOx catalyst is diagnosed to be in an abnormal state despite the NOx catalyst being in a normal state. In such a case, an accuracy of an abnormality diagnosis of the NOx catalyst can be prevented from declining by not performing the abnormality diagnosis. Moreover, the prescribed amount is determined so that an accuracy of an abnormality diagnosis is within an allowable range. Not performing an abnormality diagnosis includes, for example, reading an output value of the sensor but not performing an abnormality diagnosis using the output value. In addition, not performing an abnormality diagnosis includes, for example, performing an abnormality diagnosis based on the output value of the sensor but canceling a result of the diagnosis. Furthermore, not performing an abnormality diagnosis includes, for example, not reading the output value of the sensor.

In addition, the diagnosing unit may:

diagnose that the selective catalytic reduction NOx catalyst is in a normal state when an output value of the sensor is equal to or smaller than a threshold; and diagnose that the selective catalytic reduction NOx catalyst is in an abnormal state when the output value of the sensor is larger than the threshold, and the diagnosis control unit may correct the threshold or the output value of the sensor based on an amount of decline in output of the sensor as calculated by the calculating unit.

In other words, the diagnosing unit performs an abnormality diagnosis of a NOx catalyst by comparing an actual output value of the sensor with a threshold. In this case, the actual output value of the sensor is lower than actual concentrations of NOx and ammonia which flow out from the NOx catalyst. In addition, due to the decline in the output value of the sensor, the actual output value of the sensor may become smaller than the threshold despite the NOx catalyst being in an abnormal state. In contrast, by correcting the threshold or the output value of the sensor based on the amount of decline in output of the sensor, the actual output value of the sensor can be prevented from becoming smaller than the threshold despite the NOx catalyst being in an abnormal state. Moreover, the threshold is set as an upper limit value of the sensor output value when the NOx catalyst is in a normal state.

In addition, the diagnosis control unit can correct the threshold by subtracting the amount of decline in output from the threshold.

In other words, by reducing the threshold by the amount of decline in output of the sensor, the actual output value of the sensor can be prevented from becoming smaller than the threshold despite the NOx catalyst being in an abnormal state. Alternatively, the threshold can be corrected by multiplying the threshold by a correction coefficient based on an amount of decline in output of the sensor.

In addition, the diagnosis control unit can correct an output value of the sensor by adding the amount of decline in output to the output value of the sensor.

In other words, by increasing the output value of the sensor by the amount of decline in output of the sensor, the actual output value of the sensor can be prevented from becoming smaller than the threshold despite the NOx catalyst being in an abnormal state. Alternatively, the output value of the sensor can be corrected by multiplying the output value of the sensor by a correction coefficient based on an amount of decline in output of the sensor.

In addition, the NOx concentration estimating unit may estimate a NOx concentration in exhaust gas that flows out from the selective catalytic reduction NOx catalyst when assuming that the selective catalytic reduction NOx catalyst is in an abnormal state, the ammonia concentration estimating unit may estimate an ammonia concentration in the exhaust gas that flows out from the selective catalytic reduction NOx catalyst when assuming that the selective catalytic reduction NOx catalyst is in an abnormal state, the calculating unit may calculate the amount of decline in output when assuming that the selective catalytic reduction NOx catalyst is in an abnormal state based on the NOx concentration and the ammonia concentration in the exhaust gas that flows out from the selective catalytic reduction NOx catalyst when assuming that the selective catalytic reduction NOx catalyst is in an abnormal state, and the diagnosis control unit can correct the threshold by subtracting the amount of decline in output when assuming that the selective catalytic reduction NOx catalyst is in an abnormal state from the threshold.

Since concentrations of NOx and ammonia in exhaust gas that flows out from the NOx catalyst are higher when the NOx catalyst is in an abnormal state than when the NOx catalyst is in a normal state, an amount of decline in output of the sensor increases. The amount of decline in output of the sensor is calculated by assuming that a state exists where the amount of decline in output of the sensor increases as described above. Accordingly, when the NOx catalyst is actually in an abnormal state, the actual output value of the sensor can be prevented from becoming equal to or smaller than the threshold even if the actual output value of the sensor declines significantly. As a result, it can be diagnosed that the NOx catalyst is in an abnormal state. Alternatively, the calculating unit may calculate the amount of decline in output of the sensor when assuming that the NOx catalyst is in a prescribed state of deterioration. Moreover, instead of correcting the threshold by subtracting the amount of decline in output from the threshold, an output value of the sensor may be corrected by adding the amount of decline in output to the output value of the sensor. Furthermore, the threshold or the output value of the sensor may be corrected by multiplying the threshold or the output value of the sensor by a correction coefficient.

In addition, the NOx concentration estimating unit can estimate a NOx concentration in exhaust gas that flows out from the selective catalytic reduction NOx catalyst when assuming that the selective catalytic reduction NOx catalyst is in a normal state, and a NOx concentration in exhaust gas that flows out from the selective catalytic reduction NOx catalyst when assuming that the selective catalytic reduction NOx catalyst is in an abnormal state, the ammonia concentration estimating unit can estimate an ammonia concentration in the exhaust gas that flows out from the selective catalytic reduction NOx catalyst when assuming that the selective catalytic reduction NOx catalyst is in a normal state, and an ammonia concentration in the exhaust gas that flows out from the selective catalytic reduction NOx catalyst when assuming that the selective catalytic reduction NOx catalyst is in an abnormal state, the calculating unit can calculate the amount of decline in output when assuming that the selective catalytic reduction NOx catalyst is in a normal state based on the NOx concentration and the ammonia concentration in the exhaust gas that flows out from the selective catalytic reduction NOx catalyst when assuming that the selective catalytic reduction NOx catalyst is in a normal state and, at the same time, can calculate the amount of decline in output when assuming that the selective catalytic reduction NOx catalyst is in an abnormal state based on the NOx concentration and the ammonia concentration in the exhaust gas that flows out from the selective catalytic reduction NOx catalyst when assuming that the selective catalytic reduction NOx catalyst is in an abnormal state, and the diagnosis control unit can correct the threshold by subtracting, from the threshold, a value which is equal to or larger than the amount of decline in output when assuming that the selective catalytic reduction NOx catalyst is in an abnormal state and, at the same time, which is equal to or smaller than a sum value of the amount of decline in output when assuming that the selective catalytic reduction NOx catalyst is in an abnormal state and the amount of decline in output when assuming that the selective catalytic reduction NOx catalyst is in a normal state.

Even when the NOx catalyst is in a normal state, NOx and ammonia may flow out from the NOx catalyst. However, a decline in an output of the sensor is more prominent when the NOx catalyst is in an abnormal state than when the NOx catalyst is in a normal state. In addition, since a decline in sensor output in both a normal state and an abnormal state of the NOx catalyst can be taken into consideration by further considering an amount of decline in output of the sensor when assuming that the NOx catalyst is in a normal state, an accuracy of abnormality diagnosis can be increased. Moreover, the calculating unit may respectively calculate the amount of decline in output of the sensor when assuming that the NOx catalyst is in a prescribed state of deterioration for a case where the NOx catalyst is in a normal state and for a case where the NOx catalyst is in an abnormal state.

In addition, the diagnosing unit can perform an abnormality diagnosis when ammonia or an ammonia precursor is being supplied from the supplying unit.

When ammonia or an ammonia precursor is being supplied to the NOx catalyst, ammonia readily flows out from the NOx catalyst. In particular, outflow of ammonia from the NOx catalyst becomes prominent when the NOx catalyst is in an abnormal state. Accordingly, when the NOx catalyst is in an abnormal state, an actual output value of the sensor increases. As a result, since a difference in actual output values of the sensor between a normal state and an abnormal state of the NOx catalyst increases, an abnormality diagnosis of the NOx catalyst can be more readily performed. Accordingly, an accuracy of abnormality diagnosis can be improved.

In addition, the supplying unit can increase a supply amount of ammonia or an ammonia precursor when an abnormality diagnosis is performed by the diagnosing unit as compared to when an abnormality diagnosis is not performed by the diagnosing unit.

In other words, a larger amount of ammonia is supplied to the NOx catalyst when performing an abnormality diagnosis. Accordingly, when the NOx catalyst is in an abnormal state, a larger amount of ammonia flows out from the NOx catalyst. In other words, when the NOx catalyst is in an abnormal state, an actual output value of the sensor increases. As a result, since a difference in actual output values of the sensor between a normal state and an abnormal state of the NOx catalyst increases, an abnormality diagnosis of the NOx catalyst can be more readily performed. Accordingly, an accuracy of abnormality diagnosis can be improved. Moreover, a case where an abnormality diagnosis is not performed can be assumed to be a case where ammonia for reducing NOx is supplied to the NOx catalyst.

Advantageous Effects of Invention

According to the present invention, an erroneous diagnosis can be prevented in an abnormality diagnosis of a selective catalytic reduction NOx catalyst.

DESCRIPTION OF EMBODIMENTS

Hereinafter, modes for implementing the present invention will be described in detail by way of example of embodiments with reference to the drawings. However, it is to be understood that dimensions, materials, shapes, relative arrangements, and the like of components described in the embodiments are not intended to limit the scope of the present invention thereto unless otherwise noted.

First Embodiment

Figure 1:
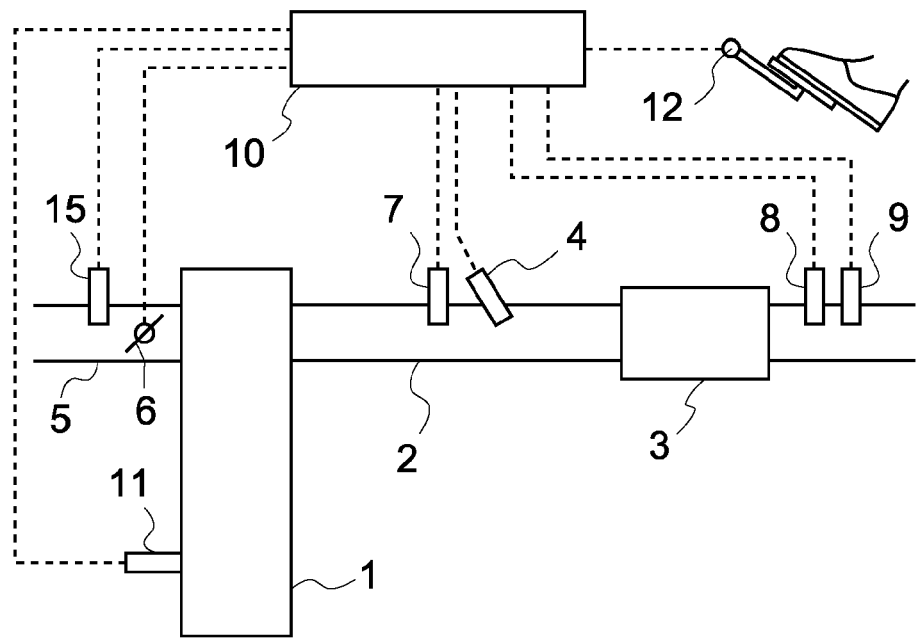
FIG. 1 is a diagram illustrating a schematic configuration of an internal combustion engine, and an air intake system and an exhaust system thereof, according to an embodiment.

FIG. 1 is a diagram illustrating a schematic configuration of an internal combustion engine, and an air intake system and an exhaust system thereof, according to the present embodiment. An internal combustion engine 1 is a diesel engine for driving a vehicle. An exhaust passage 2 is connected to the internal combustion engine 1. A selective catalytic reduction NOx catalyst 3 (hereinafter, referred to as a "NOx catalyst 3") which uses ammonia as a reducing agent to selectively reduce NOx in exhaust gas is provided in the exhaust passage 2.

In addition, an injection valve 4 that supplies the reducing agent is provided in the exhaust passage 2 on an upstream side of the NOx catalyst 3. Ammonia ($NH_3$) is used as the reducing agent. Moreover, the injection valve 4 may inject ammonia or may inject urea water that is a precursor of ammonia. Urea water injected from the injection valve 4 is hydrolyzed by heat of exhaust gas or heat from the NOx catalyst 3 and becomes ammonia to be adsorbed by the NOx catalyst 3. The ammonia is used as a reducing agent by the NOx catalyst 3. In other words, a substance that changes to ammonia or ammonia may be supplied from the injection valve 4. The substance that changes to ammonia or ammonia may be supplied in any of a gaseous state, a liquid state, and a solid state. Moreover, in the present embodiment, the injection valve 4 corresponds to the supplying unit according to the present invention.

Furthermore, an upstream side NOx sensor 7 that detects NOx in exhaust gas flowing into the NOx catalyst 3 is provided on an upstream side of the NOx catalyst 3. In addition, a downstream side NOx sensor 8 that detects NOx in exhaust gas flowing out from the NOx catalyst 3 and a temperature sensor 9 that detects exhaust temperature are provided on a downstream side of the NOx catalyst 3. Moreover, in the present embodiment, the downstream side NOx sensor 8 corresponds to the sensor according to the present invention. Moreover, a selective catalytic reduction NOx catalyst can be further provided on a downstream side of the downstream side NOx sensor 8.

Further, an intake passage 5 is connected to the internal combustion engine 1. A throttle 6 that adjusts an intake air amount of the internal combustion engine 1 is provided on the way of the intake passage 5. In addition, an air flow meter 15 that detects an intake air amount of the internal combustion engine 1 is attached to the intake passage 5 on an upstream side of the throttle 6.

Furthermore, an ECU 10 that is an electronic control unit is annexed to the internal combustion engine 1. The ECU 10 controls an operating state of the internal combustion engine 1, an exhaust gas purification apparatus, and the like. The upstream side NOx sensor 7, the downstream side NOx sensor 8, the temperature sensor 9, and the air flow meter 15 described above as well as a crank position sensor 11 and an accelerator depression amount sensor 12 are electrically connected to the ECU 10, and output values of the respective sensors are given to the ECU 10.

Therefore, the ECU 10 is able to recognize an operating state of the internal combustion engine 1 such as an engine rotational speed based on detection by the crank position sensor 11 and an engine load based on detection by the accelerator depression amount sensor 12. Moreover, while NOx in exhaust gas flowing into the NOx catalyst 3 can be detected by the upstream side NOx sensor 7 in the present embodiment, since NOx included in exhaust gas discharged from the internal combustion engine 1 (which is exhaust gas prior to being purified by the NOx catalyst 3 and which is the exhaust gas flowing into the NOx catalyst 3) is related to an operating state of the internal combustion engine 1, the NOx in the exhaust gas flowing into the NOx catalyst 3 can also be estimated based on the operating state of the internal combustion engine 1. In addition, the ECU 10 is capable of estimating a temperature of the NOx catalyst 3 based on an exhaust temperature detected by the temperature sensor 9 or by a temperature sensor provided on an upstream side of the NOx catalyst 3. Furthermore, the ECU 10 is also capable of estimating a temperature of the NOx catalyst 3 based on an operating state of the internal combustion engine 1.

In addition, in accordance with a NOx concentration (or a NOx amount) in exhaust gas that is detected or estimated, the ECU 10 issues an instruction to the injection valve 4 and causes a reducing agent to be supplied to exhaust gas in an amount necessary for reduction of NOx.

Furthermore, the ECU 10 performs an abnormality diagnosis of the NOx catalyst 3 based on a transition of output values of the downstream side NOx sensor 8. An ammonia adsorption performance and a NOx purification performance decline as deterioration of the NOx catalyst 3 progresses. In addition, as ammonia adsorption performance declines, an amount of ammonia flowing out from the NOx catalyst 3 increases. Furthermore, as NOx purification performance declines, an amount of NOx flowing out from the NOx catalyst 3 increases. Therefore, NOx concentration and ammonia concentration in exhaust gas on a downstream side of the NOx catalyst 3 increase as the NOx catalyst 3 deteriorates.

In consideration thereof, the ECU 10 diagnoses that the NOx catalyst 3 is in an abnormal state when an output value of the downstream side NOx sensor 8 is larger than a threshold and diagnoses that the NOx catalyst 3 is in a normal state when the output value of the downstream side NOx sensor 8 is smaller than the threshold. In this case, an abnormal state of the NOx catalyst 3 refers to a case where a degree of decline of the ammonia adsorption performance exceeds an allowable range. Alternatively, an abnormal state of the NOx catalyst 3 may be assumed to be a case where a degree of deterioration of the NOx catalyst 3 exceeds an allowable range. The threshold is the output value of the downstream side NOx sensor 8 when the NOx catalyst 3 is on a border between a normal state and an abnormal state. Alternatively, the threshold may be set to an upper limit value of the output value of the downstream side NOx sensor 8 when the NOx catalyst 3 is in a normal state. An abnormal state of the NOx catalyst 3 refers to a state where the NOx catalyst 3 has deteriorated until NOx emission from the NOx catalyst 3 exceeds an allowable range or a regulation value. Moreover, the threshold may be provided with a certain amount of margin. In addition, before performing an abnormality diagnosis of the NOx catalyst 3, other devices such as the injection valve 4 and the downstream side NOx sensor 8 may be checked using known techniques to determine whether the devices are in their normal states.

The downstream side NOx sensor 8 receives interference from ammonia. Since ammonia reacts with $O_2$ at the downstream side NOx sensor 8 to create NO, the ammonia is detected as NOx. Therefore, when ammonia molecules are contained in exhaust gas flowing into a detecting unit of the downstream side NOx sensor 8, the ammonia molecules are detected as NOx. Accordingly, when ammonia flows out from the NOx catalyst 3, the output value of the downstream side NOx sensor 8 increases. In other words, when NOx and ammonia flow out from the NOx catalyst 3 as the NOx catalyst 3 deteriorates, the output value of the downstream side NOx sensor 8 increases. Therefore, it can be diagnosed that the NOx catalyst 3 is in an abnormal state when the output value of the downstream side NOx sensor 8 exceeds the threshold.

Figure 2:
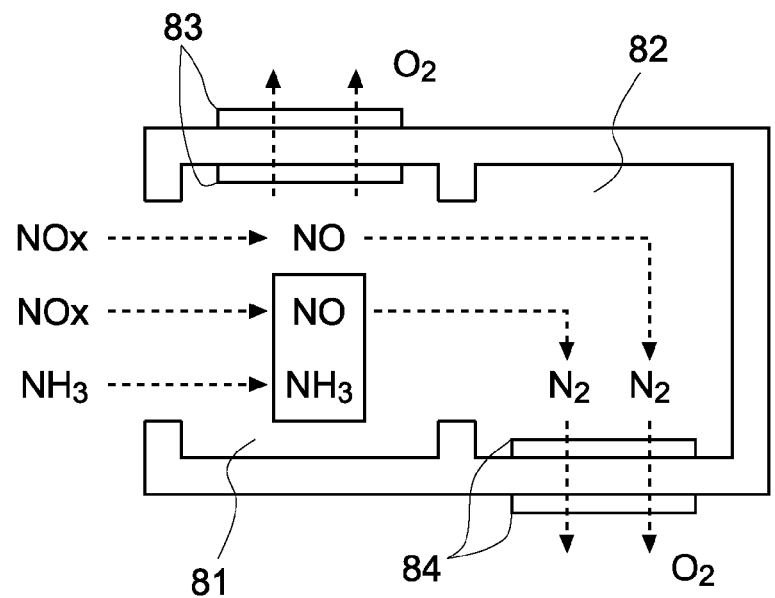
FIG. 2 is a diagram illustrating a schematic configuration of a detecting unit of a downstream side NOx sensor according to an embodiment.

Meanwhile, with a general downstream side NOx sensor 8 using a Pt electrode, since NOx and ammonia react with each other at the electrode, NOx and ammonia decrease. FIG. 2 is a diagram illustrating a schematic configuration of a detecting unit of the downstream side NOx sensor 8 according to the present embodiment. The downstream side NOx sensor 8 is configured to include a first chamber 81 into which exhaust gas flows from the exhaust passage 2 and a second chamber 82 connected to the first chamber 81. An oxygen pump (electrodes) 83 is provided in the first chamber 81 and a monitor cell (electrodes) 84 is provided in the second chamber 82. In the first chamber 81, oxygen in exhaust gas is removed by the oxygen pump 83. In addition, in the first chamber 81, $NO_2$ in exhaust gas is reduced to NO. Therefore, NO flows into the second chamber 82. Furthermore, in the second chamber 82, NO is decomposed into $N_2$ and $O_2$ and an amount of oxygen created by the decomposition is measured by the monitor cell 84. In addition, as described earlier, since ammonia reacts with $O_2$ at the downstream side NOx sensor 8 to create NO, the ammonia is detected as NOx. Therefore, a current flowing through the monitor cell 84 has a value in accordance with concentrations of NOx and ammonia. However, when NOx and ammonia are contained in exhaust gas, NO and ammonia react with each other on the oxygen pump 83. In addition, the output value of the downstream side NOx sensor 8 becomes a value in accordance with NOx and ammonia after reduction on the oxygen pump 83. Therefore, when NOx and ammonia are present in exhaust gas, the output value of the downstream side NOx sensor 8 falls below a value combining actual concentrations of NOx and ammonia in exhaust gas. This phenomenon is not limited to a sensor with the structure shown in FIG. 2 and may occur at any sensor where ammonia and NOx can react with each other.

Figure 3:
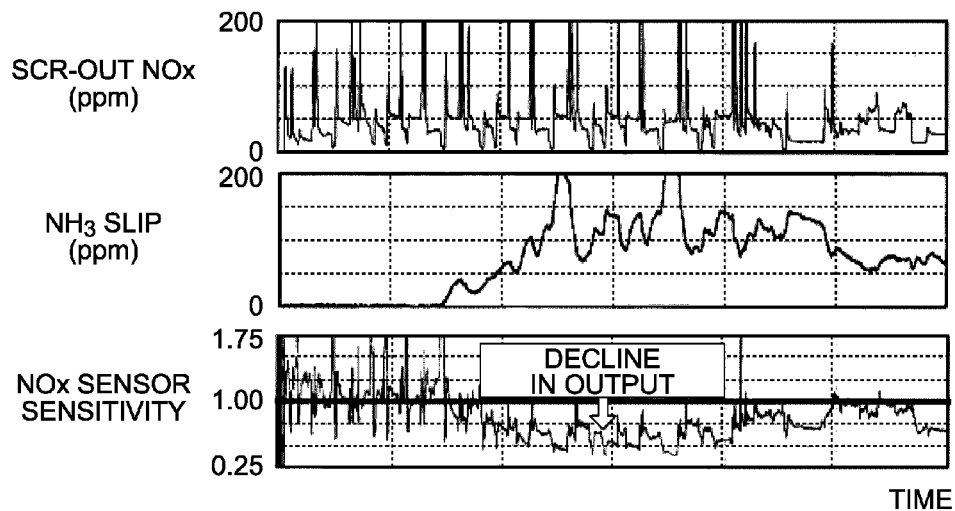
FIG. 3 is a diagram indicating transitions of a concentration of NOx flowing out from a NOx catalyst (SCR-out NOx), a concentration of ammonia flowing out from a NOx catalyst ($NH_3$ slip), and sensitivity of the downstream side NOx sensor (NOx sensor sensitivity).

FIG. 3 is a diagram indicating transitions of a concentration of NOx flowing out from the NOx catalyst 3 (SCR-out NOx), a concentration of ammonia flowing out from the NOx catalyst 3 ($NH_3$ slip), and sensitivity of the downstream side NOx sensor 8 (NOx sensor sensitivity). A horizontal axis represents time. The sensitivity of the downstream side NOx sensor 8 is a value obtained by dividing the output value of the downstream side NOx sensor 8 by a sum value of an actual NOx concentration and an actual ammonia concentration. The concentration of NOx flowing out from the NOx catalyst 3 and the concentration of ammonia flowing out from the NOx catalyst 3 are actual concentrations.

If the downstream side NOx sensor 8 is able to accurately detect concentrations of NOx and ammonia, the sensitivity of the downstream side NOx sensor 8 is 1. However, in reality, the sensitivity of the downstream side NOx sensor 8 falls below 1 when NOx and ammonia are present. In other words, since the output value of the downstream side NOx sensor 8 decreases by an amount corresponding to the decrease in NOx and ammonia due to a reaction thereof, the sensitivity of the downstream side NOx sensor 8 declines.

In addition, when an abnormality diagnosis of the NOx catalyst 3 is performed when NOx and ammonia are contained in exhaust gas, due to the decrease in NOx and ammonia at the electrode of the downstream side NOx sensor 8, there is a risk that the output value of the downstream side NOx sensor 8 may equal or become smaller than the threshold despite the NOx catalyst 3 being in an abnormal state. In other words, there is a risk that the NOx catalyst 3 is diagnosed to be in a normal state despite being in an abnormal state. In consideration thereof, when NOx and ammonia are contained in exhaust gas, the ECU 10 obtains an amount of decline in output of the downstream side NOx sensor 8 in accordance with concentrations of NOx and ammonia and corrects the threshold based on the amount of decline in output when performing an abnormality diagnosis of the NOx catalyst 3. The amount of decline in output is an amount of decline with respect to an output corresponding to a sum value of the concentrations of NOx and ammonia that flow into the downstream side NOx sensor 8. The concentrations of NOx and ammonia that flow into the downstream side NOx sensor 8 can be assumed to be equal to concentrations of NOx and ammonia which flow out from the NOx catalyst 3. The amount of decline in output corresponds to output that has decreased due to the reaction between NOx and ammonia at the downstream side NOx sensor 8.

In this case, the amount of decline in output of the downstream side NOx sensor 8 is related to a reaction rate of NOx and ammonia at the downstream side NOx sensor 8. A reaction rate can be expressed by concentrations of reactants and a coefficient determined by a material of the downstream side NOx sensor 8 and the like. Note that the NOx that reacts with ammonia at the downstream side NOx sensor 8 includes NOx contained in exhaust gas to begin with as well as NOx created by oxidation of ammonia at the oxygen pump 83 of the downstream side NOx sensor 8.

First, a reaction between NOx created by the oxidation of ammonia and ammonia will be described. The amount of decline in output of the downstream side NOx sensor 8 due to the reaction between NOx created by the oxidation of ammonia and ammonia is related to a rate at which ammonia is oxidized to NOx and to a rate at which the NOx is oxidized by other ammonia. In addition, the higher the ammonia concentration, the higher the oxidation rate of ammonia. Therefore, an oxidation rate when ammonia is oxidized can be expressed by the following equation.

$$\text{Oxidation rate} = k1[NH_3] \quad \text{(Equation 1)}$$

Note that, k1 is a coefficient and is a value determined by a material of the sensor or the like. Further, $[NH_3]$ denotes a concentration of ammonia.

In addition, the higher a reduction rate of NOx, the larger the amount of decline in output of the downstream side NOx sensor 8. Furthermore, the higher the concentration of NOx or ammonia, the larger the amount of decline in output of the downstream side NOx sensor 8 since NOx is more readily reduced by ammonia.

In other words, a reduction rate when NOx created by the oxidation of ammonia and ammonia react with each other can be expressed by the following equation.

$$\text{Reduction rate} = k2(k1[NH_3] \times [NH_3]) \quad \text{(Equation 2)}$$

k2 is a coefficient and is a value determined by a material of a sensor or the like.

Next, a reaction between NOx contained in exhaust gas to begin with (in other words, NOx having flowed out from the NOx catalyst 3) and ammonia will be described. When NOx contained in exhaust gas to begin with is reduced by ammonia, since the higher the NOx concentration and the higher the ammonia concentration, the higher the reaction rate, the amount of decline in output of the downstream side NOx sensor 8 increases. Therefore, a reduction rate when NOx contained in exhaust gas to begin with is reduced by ammonia can be expressed by the following equation.

$$\text{Oxidation rate} = k3[NOx] \times [NH_3] \quad \text{(Equation 3)}$$

Moreover, k3 is a coefficient and is a value determined by a material of a sensor or the like. In addition, [NOx] denotes a concentration of NOx.

In addition, the amount of decline in output of the downstream side NOx sensor 8 can be expressed by the following equation as a value related to k1, k2, k3, [NOx], and $[NH_3]$.

$$\text{Amount of decline in output} = F(k1,k2,k3,[NOx],[NH_3]) \quad \text{(Equation 4)}$$

Since k1, k2, and k3 can be obtained in advance, the amount of decline in output of the downstream side NOx sensor 8 can be calculated based on concentrations of NOx and ammonia in exhaust gas that flows out from the NOx catalyst 3. This relationship can be obtained by an experiment, a simulation, or the like in advance.

Figure 4:
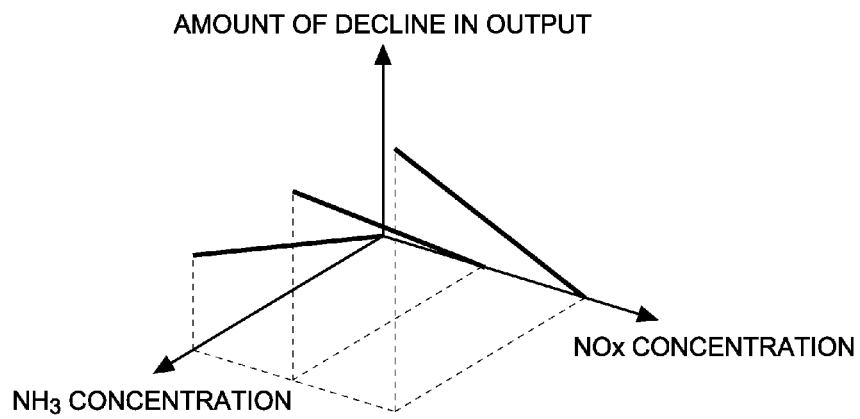
FIG. 4 is a diagram indicating a relationship among ammonia ($NH_3$) concentration, NOx concentration, and an amount of decline in output of the downstream side NOx sensor.

FIG. 4 is a diagram indicating a relationship among ammonia ($NH_3$) concentration, NOx concentration, and an amount of decline in output of the downstream side NOx sensor 8. The higher the NOx concentration and the higher the ammonia concentration, the larger the amount of decline in output of the downstream side NOx sensor 8. For example, by obtaining the relationship shown in FIG. 4 by an experiment, a simulation, or the like, and mapping and storing the relationship in the ECU 10 in advance, the amount of decline in output of the downstream side NOx sensor 8 can be calculated based on the concentrations of NOx and ammonia in exhaust gas that flows out from the NOx catalyst 3 during traveling.

The concentrations of NOx and ammonia which flow out from the NOx catalyst 3 are estimated by the ECU 10. For example, since an operating state of the internal combustion engine 1 and a concentration of NOx in exhaust gas from the internal combustion engine 1 are related to each other, a NOx concentration in exhaust gas from the internal combustion engine 1 or, in other words, a NOx concentration in exhaust gas that flows into the NOx catalyst 3 can be estimated based on the operating state of the internal combustion engine 1. In addition, an amount of decline in NOx concentration due to purification of NOx by the NOx catalyst 3 when assuming that the NOx catalyst 3 is in a normal state or when assuming that the NOx catalyst 3 is in an abnormal state can also be estimated. For example, NOx purification rates can be respectively set for a case where the NOx catalyst 3 is in a normal state and for a case where the NOx catalyst 3 is in an abnormal state, and amounts of decline in NOx concentration can be respectively calculated based on the NOx purification rates. Moreover, since a NOx purification rate also changes in accordance with a temperature of the NOx catalyst 3 and a flow velocity of exhaust gas passing through the NOx catalyst 3, the NOx purification rate may be set in consideration of these influences. As described above, a NOx concentration in exhaust gas that flows out from the NOx catalyst 3 can be respectively estimated for a case where the NOx catalyst 3 is assumed to be in a normal state and for a case where the NOx catalyst 3 is assumed to be in an abnormal state. These relationships can be obtained by an experiment, a simulation, or the like in advance.

In addition, an ammonia concentration in exhaust gas that flows out from the NOx catalyst 3 changes in accordance with an amount of ammonia that is injected from the injection valve 4, a temperature of the exhaust gas, and a degree of deterioration of the NOx catalyst 3. For example, the larger the amount of ammonia that is injected from the injection valve 4, the higher the temperature of the exhaust gas, and the greater the degree of deterioration of the NOx catalyst 3, the higher the ammonia concentration in exhaust gas that flows out from the NOx catalyst 3. Therefore, by obtaining these relationships by an experiment, a simulation, or the like in advance, an ammonia concentration in exhaust gas that flows out from the NOx catalyst 3 can be respectively estimated for a case where the NOx catalyst 3 is assumed to be in a normal state and for a case where the NOx catalyst 3 is assumed to be in an abnormal state.

Moreover, k1, k2, and k3 can be respectively obtained by an experiment, a simulation, or the like. k1, k2, and k3 may be constant values. Alternatively, k1, k2, and k3 may be corrected in accordance with a temperature of exhaust gas, a temperature of a sensor element of the downstream side NOx sensor 8, a flow velocity of exhaust gas (or a flow rate of exhaust gas), or the like.

Figure 5:
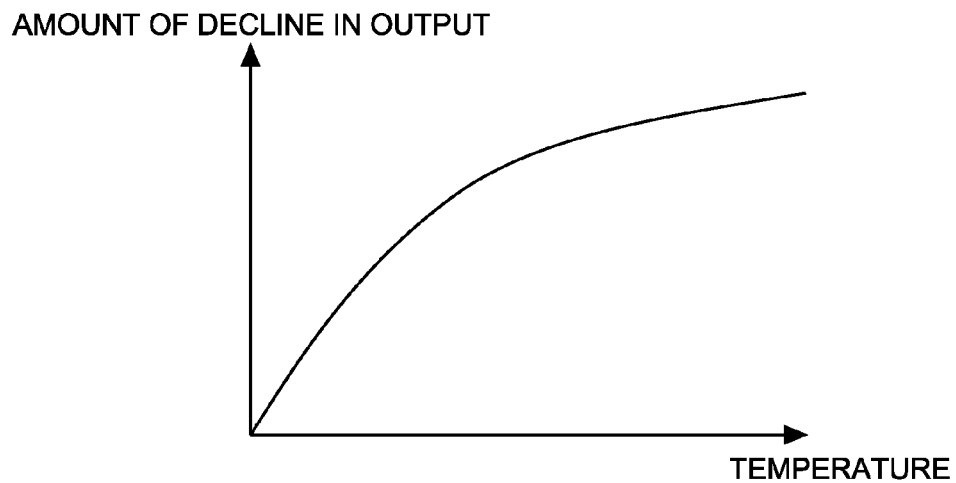
FIG. 5 is a diagram indicating a relationship between temperature and an amount of decline in output of the downstream side NOx sensor.

FIG. 5 is a diagram indicating a relationship between temperature and an amount of decline in output of the downstream side NOx sensor 8. As the temperature, a temperature of exhaust gas that passes through the downstream side NOx sensor 8, a temperature of exhaust gas in the vicinity of the downstream side NOx sensor 8, or a temperature of a sensor element of the downstream side NOx sensor 8 can be adopted.

When the temperature is denoted by T, the amount of decline in output of the downstream side NOx sensor 8 generally assumes a value proportional to "$\exp(-E/T)$". In other words, the higher the temperature, the larger the amount of decline in output of the downstream side NOx sensor 8 since a reaction between NOx and ammonia becomes active. However, the higher the temperature, the smaller the degree of rise of the amount of decline in output of the downstream side NOx sensor 8 with respect to temperature rise.

Therefore, a correction in accordance with the temperature can be performed by correcting k1, k2, and k3 or correcting the amount of decline in output of the downstream side NOx sensor 8 to be proportional to "$\exp(-E/T)$".

For example, by obtaining a coefficient for correcting the amount of decline in output of the downstream side NOx sensor 8 with respect to temperature by an experiment, a simulation, or the like, and mapping the coefficient in advance, a coefficient for correcting the amount of decline in output of the downstream side NOx sensor 8 based on the temperature can be obtained. In addition, a correction in accordance with the temperature can be performed by multiplying the amount of decline in output of the downstream side NOx sensor 8 by the coefficient. Furthermore, relationships between temperature and k1, k2, and k3 may be obtained by an experiment, a simulation, or the like, and mapped in advance.

Figure 6:
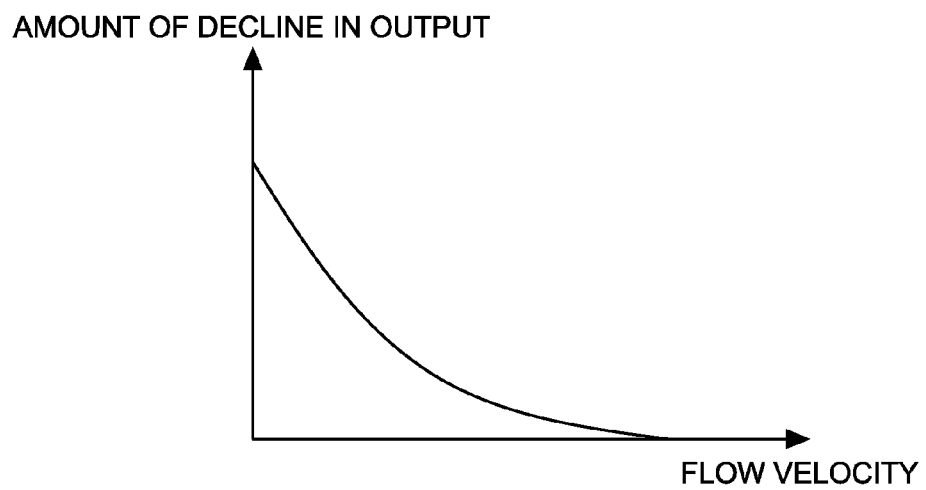
FIG. 6 is a diagram indicating a relationship between a flow velocity of exhaust gas and an amount of decline in output of the downstream side NOx sensor.

FIG. 6 is a diagram indicating a relationship between a flow velocity of exhaust gas and an amount of decline in output of the downstream side NOx sensor 8. The flow velocity of exhaust gas is a flow velocity of exhaust gas in the downstream side NOx sensor 8. However, when the flow velocity of exhaust gas in the downstream side NOx sensor 8 is correlated with a flow velocity of exhaust gas in the vicinity of the downstream side NOx sensor 8, the flow velocity of exhaust gas in the vicinity of the downstream side NOx sensor 8 may be adopted as the flow velocity of exhaust gas shown in FIG. 6.

Since a period of time during which exhaust gas is in contact with a sensor element changes in accordance with the flow velocity of exhaust gas, a period of time during which NOx and ammonia are able to react with each other also changes. In addition, the shorter the reaction time between NOx and ammonia, the smaller the amount of decrease in NOx and ammonia. In other words, the faster the flow velocity of exhaust gas, the smaller the amount of decline in output of the downstream side NOx sensor 8 due to a shorter reaction time.

Therefore, a correction in accordance with the flow velocity of exhaust gas can be performed by correcting k1, k2, and k3 or correcting the amount of decline in output of the downstream side NOx sensor 8 so as to satisfy the relationship shown in FIG. 6.

For example, by obtaining a coefficient for correcting the amount of decline in output of the downstream side NOx sensor 8 with respect to the flow velocity of exhaust gas by an experiment, a simulation, or the like, and mapping the coefficient in advance, a coefficient for correcting the amount of decline in output of the downstream side NOx sensor 8 based on the flow velocity of exhaust gas can be obtained. In addition, a correction in accordance with the flow velocity of exhaust gas can be performed by multiplying the amount of decline in output of the downstream side NOx sensor 8 by the coefficient. Furthermore, relationships between the flow velocity of exhaust gas and k1, k2, and k3 may be obtained by an experiment, a simulation, or the like, and mapped in advance. In addition, the flow velocity of exhaust gas can be obtained based on an intake air amount detected by the air flow meter 15.

The amount of decline in output of the downstream side NOx sensor 8 can be obtained in this manner. In addition, the ECU 10 corrects the threshold used when performing an abnormality diagnosis of the NOx catalyst 3 based on the amount of decline in output of the downstream side NOx sensor 8.

Figure 7:
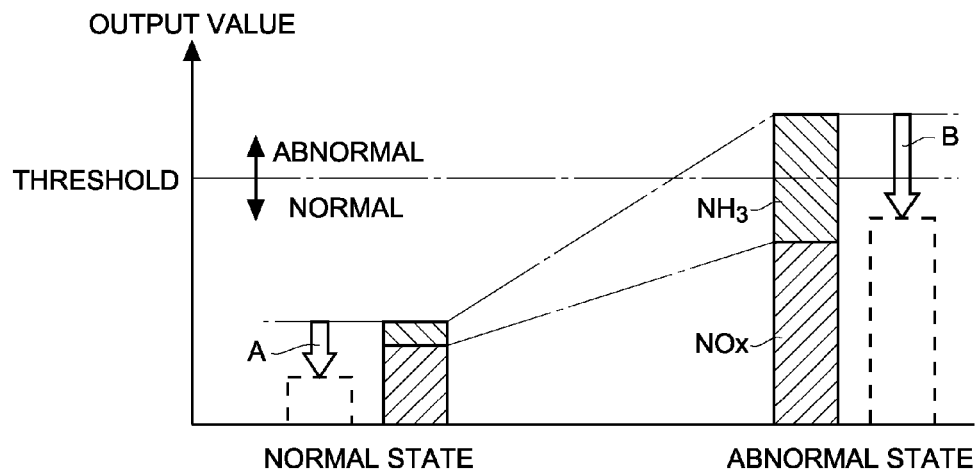
FIG. 7 is a diagram indicating output values of the downstream side NOx sensor in a normal state and an abnormal state of a NOx catalyst.

FIG. 7 is a illustrating output values of the downstream side NOx sensor 8 in a normal state and an abnormal state of the NOx catalyst 3. A solid line depicts actual concentrations of NOx and ammonia in the vicinity of the downstream side NOx sensor 8. Alternatively, the solid line may depict concentrations of NOx and ammonia in exhaust gas that flows out from the NOx catalyst 3. In addition, a dashed line depicts the output value of the downstream side NOx sensor 8 when NOx and ammonia react with each other at the downstream side NOx sensor 8 and depicts actual output values of the downstream side NOx sensor 8.

"$NH_3$" in FIG. 7 denotes an increase in output due to ammonia and indicates a concentration of ammonia in exhaust gas. In addition, "NOx" denotes an increase in output due to NOx and indicates a concentration of NOx in exhaust gas. The threshold is a threshold for diagnosing whether the NOx catalyst 3 is in a normal state or an abnormal state. When the output value of the downstream side NOx sensor 8 is equal to or smaller than the threshold, it is diagnosed that the NOx catalyst 3 is in a normal state, and when the output value of the downstream side NOx sensor 8 is larger than the threshold, it is diagnosed that the NOx catalyst 3 is in an abnormal state. Moreover, the threshold shown in FIG. 7 is a threshold before correction. Since the threshold before correction is related to an operating state of the internal combustion engine 1 (for example, an engine rotational speed and an engine load), a relationship between the operating state of the internal combustion engine 1 and the threshold can be obtained by an experiment, a simulation, or the like in advance. In addition, since concentrations of NOx and ammonia in exhaust gas that flows out from the NOx catalyst 3 also change in accordance with a temperature of the NOx catalyst 3 and a flow velocity of exhaust gas that passes through the NOx catalyst 3, the threshold may be set in consideration of these influences.

The amount of decline in output of the downstream side NOx sensor 8 in a case where NOx and ammonia react with each other at the downstream side NOx sensor 8 is denoted by A when the NOx catalyst 3 is in a normal state and denoted by B when the NOx catalyst 3 is in an abnormal state.

As described above, the ECU 10 diagnoses that the NOx catalyst 3 is in an abnormal state when the output value of the downstream side NOx sensor 8 is larger than the threshold. In addition, when the NOx catalyst 3 is in a normal state, the output value of the downstream side NOx sensor 8 is equal to or smaller than the threshold. Therefore, it can be diagnosed that the NOx catalyst 3 is in a normal state in an accurate manner. On the other hand, when the NOx catalyst 3 is in an abnormal state, amounts of NOx and ammonia which flow out from the NOx catalyst 3 increase. Therefore, since the amount of decline in output of the downstream side NOx sensor 8 increases, an actual output value of the downstream side NOx sensor 8 may fall below the threshold. As a result, there is a risk that an erroneous diagnosis of the NOx catalyst 3 being in a normal state may be made despite the NOx catalyst 3 being in an abnormal state. In comparison, in the present embodiment, the threshold is corrected in accordance with the amount of decline in output of the downstream side NOx sensor 8.

Figure 8:
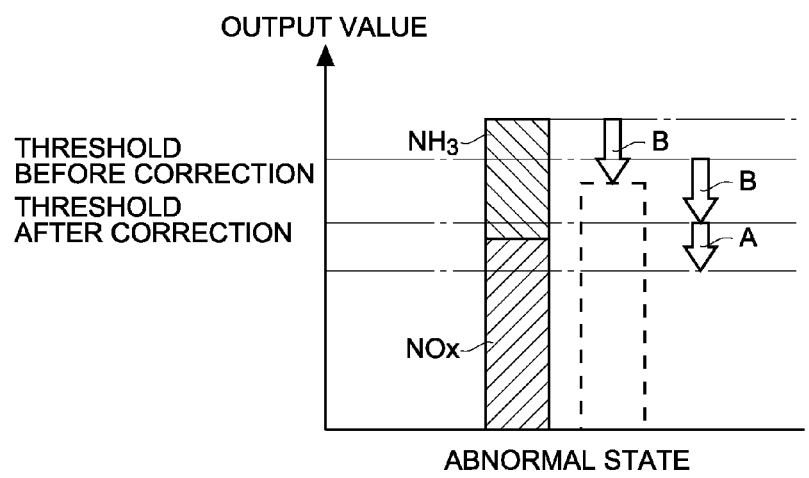
FIG. 8 is a diagram indicating a relationship between a threshold before correction and a threshold after correction.

FIG. 8 is a diagram indicating a relationship between a threshold before correction and a threshold after correction. The threshold after correction is set to a smaller value than the threshold before correction. The threshold before correction is set as an upper limit value of a sum value of ammonia concentration and NOx concentration in the vicinity of the downstream side NOx sensor 8 when the NOx catalyst 3 is in a normal state. In other words, the threshold before correction is concentrations of NOx and ammonia in exhaust gas that flows out from the NOx catalyst 3 when a degree of deterioration of the NOx catalyst 3 is within an allowable range. On the other hand, the threshold after correction is determined based on an amount of decline in output B of the downstream side NOx sensor 8 which is calculated by assuming that the NOx catalyst 3 is in an abnormal state. For example, assuming that the NOx catalyst 3 is in an abnormal state, concentrations of NOx and ammonia in exhaust gas that flows out from the NOx catalyst 3 are estimated. Subsequently, based on the estimated values of the concentrations of NOx and ammonia, the amount of decline in output B of the downstream side NOx sensor 8 is calculated. Since a decline in output of the downstream side NOx sensor 8 becomes prominent when assuming that the NOx catalyst 3 is in an abnormal state, by correcting the threshold based on the amount of decline in output, an accuracy of an abnormality diagnosis of the NOx catalyst 3 can be increased.

For example, the threshold after correction can be set to a value obtained by subtracting "the amount of decline in output B of the downstream side NOx sensor 8 which is calculated by assuming that the NOx catalyst 3 is in an abnormal state" from "the threshold before correction". In this manner, the amount of decline in output B of the downstream side NOx sensor 8 which is calculated by assuming that the NOx catalyst 3 is in an abnormal state can be adopted as the threshold correction amount.

Moreover, "the amount of decline in output B of the downstream side NOx sensor 8 which is calculated by assuming that the NOx catalyst 3 is in an abnormal state" may be replaced by "the amount of decline in output of the downstream side NOx sensor 8 which is calculated by assuming that a degree of deterioration of the NOx catalyst 3 is a prescribed degree of deterioration exceeding an allowable range" or by "the amount of decline in output of the downstream side NOx sensor 8 which is calculated by assuming that the NOx catalyst 3 is on a border between a normal state and an abnormal state".

In addition, a sum value (A+B) of "the amount of decline in output B of the downstream side NOx sensor 8 which is calculated by assuming that the NOx catalyst 3 is in an abnormal state" and "an amount of decline in output A of the downstream side NOx sensor 8 which is calculated by assuming that the NOx catalyst 3 is in a normal state" may be adopted as the threshold correction amount. In other words, the threshold after correction may be set to a value obtained by subtracting the sum value (A+B) from the threshold before correction. For example, assuming that the NOx catalyst 3 is in a normal state, concentrations of NOx and ammonia in exhaust gas that flows out from the NOx catalyst 3 are estimated. Subsequently, based on the estimated values of the concentrations of NOx and ammonia, the amount of decline in output A of the downstream side NOx sensor 8 is calculated.

The threshold of the output value of the downstream side NOx sensor 8 should be set so as to be equal to or larger than the output value when the NOx catalyst 3 is in a normal state and, at the same time, to be smaller than the output value when the NOx catalyst 3 is in an abnormal state. The amount of decline in output of the downstream side NOx sensor 8 changes in accordance with operating conditions of the internal combustion engine 1 and the like. In addition, when the threshold is connected solely based on the amount of decline in output B of the downstream side NOx sensor 8 which is calculated by assuming that the NOx catalyst 3 is in an abnormal state, depending on the operating conditions of the internal combustion engine 1 and the like, the threshold after correction may become smaller than the output value of the downstream side NOx sensor 8 which is calculated by assuming that the NOx catalyst 3 is in a normal state. In this case, the threshold of the output value of the downstream side NOx sensor 8 cannot be set so as to be equal to or larger than the output value when the NOx catalyst 3 is in a normal state and, at the same time, to be smaller than the output value when the NOx catalyst 3 is in an abnormal state. In comparison, the threshold can be set to the range described above by further taking into consideration the amount of decline in output A of the downstream side NOx sensor 8 which is calculated by assuming that the NOx catalyst 3 is in a normal state. In addition, a smaller threshold is preferable in order to prevent an erroneous determination that the NOx catalyst 3 is in a normal state despite the NOx catalyst 3 being in an abnormal state. Therefore, by further taking into consideration the amount of decline in output A of the downstream side NOx sensor 8 and further reducing the threshold, an erroneous determination that the NOx catalyst 4 is in a normal state despite the NOx catalyst 4 being in an abnormal state can be prevented.

In addition, the threshold correction amount may be set to a value which is equal to or larger than "the amount of decline in output B of the downstream side NOx sensor 8 which is calculated by assuming that the NOx catalyst 3 is in an abnormal state" and, at the same time, which is equal to or smaller than "the sum value (A+B)". In other words, the threshold correction amount may be set so as to satisfy the relationship provided below.

$$B \leq \text{threshold correction amount} \leq A+B$$

By correcting the threshold as described above, when the NOx catalyst 3 is in a normal state, an actual output value of the downstream side NOx sensor 8 becomes equal to or smaller than the threshold after correction. Therefore, it can be diagnosed that the NOx catalyst 3 is in a normal state. In addition, when the NOx catalyst 3 is in an abnormal state, an actual output value of the downstream side NOx sensor 8 becomes larger than the threshold after correction. Therefore, it can be diagnosed that the NOx catalyst 3 is in an abnormal state.

Figure 9:
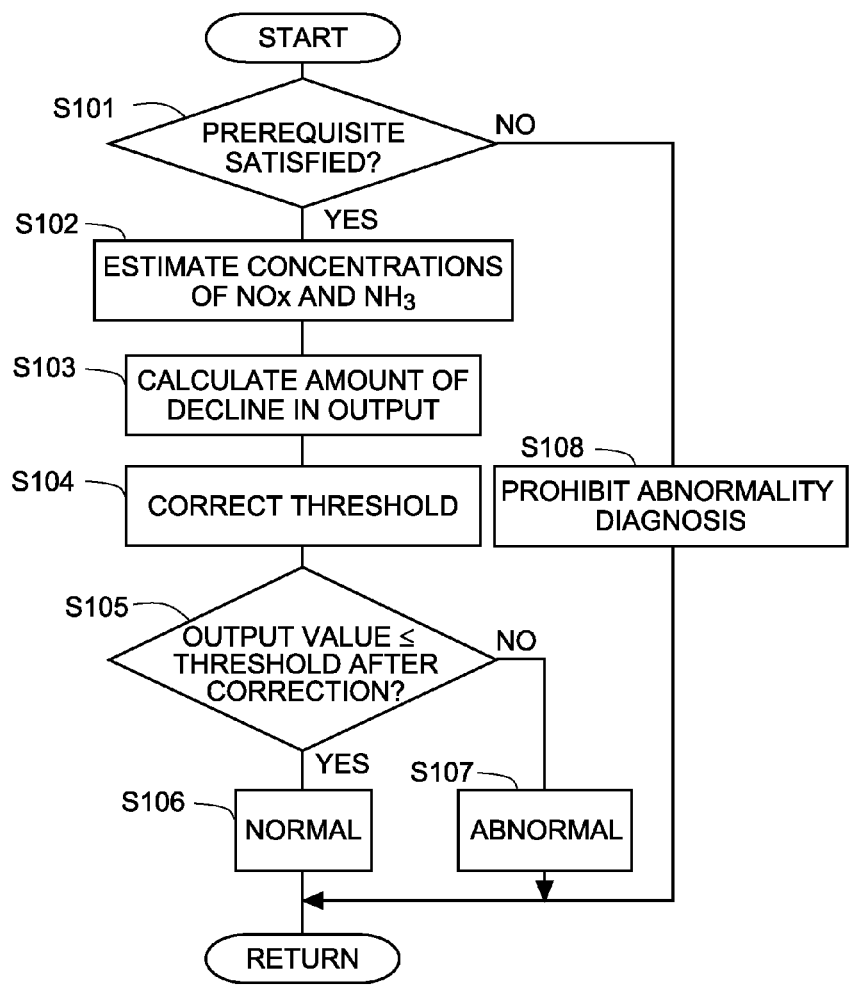
FIG. 9 is a flow chart indicating a flow of an abnormality diagnosis of a NOx catalyst according to a first embodiment.

FIG. 9 is a flow chart indicating a flow of an abnormality diagnosis of the NOx catalyst 3 according to the present embodiment. The present routine is executed every prescribed time by the ECU 10.

In step S101, it is determined whether or not a prerequisite for performing an abnormality detection of the NOx catalyst 3 is satisfied. In the present step, it is determined whether or not a state exists where an abnormality diagnosis of the NOx catalyst 3 can be accurately performed. For example, the existence of a state where a purification rate of NOx is high if the NOx catalyst 3 is in a normal state and, at the same time, where NOx and ammonia can be detected by the downstream side NOx sensor 8 is adopted as the prerequisite. For example, the prerequisite for performing an abnormality diagnosis of the NOx catalyst 3 is determined to be satisfied when all of the following is true: the NOx catalyst 3 is activated; the downstream side NOx sensor 8 is activated; and warming up of the internal combustion engine 1 has been completed. A temperature of the NOx catalyst 3 can be detected by the temperature sensor 9. In addition, whether or not the downstream side NOx sensor 8 is activated can be determined using known techniques. Furthermore, in the present step, ammonia or an ammonia precursor being supplied from the injection valve 4 can be added to the prerequisite. When a positive determination is made in step S101, the present routine advances to step S102, and when a negative determination is made, the present routine advances to step S108.

In step S102, concentrations of NOx and ammonia which flow out from the NOx catalyst 3 are estimated. The concentrations of NOx and ammonia are values obtained based on an operating state of the internal combustion engine 1 or the like and are values which assume that the NOx catalyst 3 is in an abnormal state. Alternatively, values which assume that the NOx catalyst 3 is in a normal state may be estimated. Note that, in the present embodiment, the ECU 10 that processes step S102 corresponds to the NOx concentration estimating unit and the ammonia concentration estimating unit according to the present invention.

In step S103, the amount of decline in output of the downstream side NOx sensor 8 is calculated. The amount of decline in output is calculated according to Equation 4 provided earlier based on estimated values of the concentrations of NOx and ammonia which flow out from the NOx catalyst 3 which are estimated in step S102.

Equation 4 and the coefficients k1, k2, and k3 are to be obtained by an experiment, a simulation, or the like and stored in the ECU 10 in advance. In the present step, the amount of decline in output of the downstream side NOx sensor 8 when assuming that the NOx catalyst 3 is in a normal state may be further calculated. Note that, in the present embodiment, the ECU 10 that processes step S103 corresponds to the calculating unit according to the present invention.

In step S104, the threshold used when performing an abnormality diagnosis of the NOx catalyst 3 is corrected based on the amount of decline in output of the downstream side NOx sensor 8 calculated in step S103. The threshold before correction is to be obtained by an experiment, a simulation, or the like in advance. In addition, the threshold after correction can be calculated by subtracting the amount of decline in output B of the downstream side NOx sensor 8 which is calculated by assuming that the NOx catalyst 3 is in an abnormal state from the threshold before correction. Note that, the threshold after correction may be set to a value obtained by subtracting "the sum value (A+B) of the amount of decline in output B of the downstream side NOx sensor 8 which is calculated by assuming that the NOx catalyst 3 is in an abnormal state and the amount of decline in output A of the downstream side NOx sensor 8 which is calculated by assuming that the NOx catalyst 3 is in a normal state" from the "threshold before correction". Alternatively, the threshold after correction may be set to a value obtained by subtracting a value which is equal to or larger than "the amount of decline in output B of the downstream side NOx sensor 8 which is calculated by assuming that the NOx catalyst 3 is in an abnormal state" and, at the same time, which is equal to or smaller than "the sum value (A+B) of the amount of decline in output B of the downstream side NOx sensor 8 which is calculated by assuming that the NOx catalyst 3 is in an abnormal state and the amount of decline in output A of the downstream side NOx sensor 8 which is calculated by assuming that the NOx catalyst 3 is in a normal state" from the "threshold before correction".

In step S105, it is determined whether or not the output value of the downstream side NOx sensor 8 is equal to or smaller than the threshold after correction. In other words, an abnormality diagnosis of the NOx catalyst 3 is performed. When a positive determination is made in step S105, the present routine proceeds to step S106 and a diagnosis is made that the NOx catalyst 3 is in a normal state. On the other hand, when a negative determination is made in step S105, the present routine proceeds to step S107 and a diagnosis is made that the NOx catalyst 3 is in an abnormal state. Moreover, in the present embodiment, the ECU 10 that processes step S104 corresponds to the diagnosis control unit according to the present invention, and the ECU 10 that processes steps S105, S106, and S107 corresponds to the diagnosing unit according to the present invention.

On the other hand, in step S108, since a state suitable for an abnormality diagnosis of the NOx catalyst 3 does not exist, an abnormality diagnosis of the NOx catalyst 3 is prohibited. In other words, an abnormality diagnosis of the NOx catalyst 3 is not performed. Not performing an abnormality diagnosis includes, for example, the ECU 10 reading the output value of the downstream side NOx sensor 8 but not performing an abnormality diagnosis using the output value. In addition, not performing an abnormality diagnosis includes, for example, the ECU 10 performing an abnormality diagnosis based on the output value of the NOx sensor 8 but canceling a result of the diagnosis. Furthermore, not performing an abnormality diagnosis includes, for example, the ECU 10 not reading the output value of the downstream side NOx sensor 8.

Moreover, the output value of the downstream side NOx sensor 8 may sometimes be corrected using a correction coefficient that is determined in accordance with a temperature or a flow velocity of exhaust gas. In such a case, the correction coefficient of the output value of the downstream side NOx sensor 8 may be corrected instead of correcting the coefficient.

Moreover, an abnormality diagnosis of the NOx catalyst 3 according to the present embodiment can be performed even in a situation where, for example, ammonia flows out from the NOx catalyst 3. Therefore, when performing an abnormality diagnosis of the NOx catalyst 3, a larger amount of ammonia than usual may be supplied to the NOx catalyst 3. In this case, usual refers to a case where an abnormality diagnosis of the NOx catalyst 3 is not performed. Alternatively, usual may be assumed to be a case where ammonia is supplied in accordance with NOx flowing into the NOx catalyst 3 in order to purify the NOx at the NOx catalyst 3. In other words, while the ECU 10 supplies ammonia in an amount in accordance with an amount of NOx that flows into the NOx catalyst 3 in order to reduce NOx, the ECU 10 may supply a larger amount of ammonia when performing an abnormality diagnosis. In addition, an amount of ammonia that is supplied when performing an abnormality diagnosis of the NOx catalyst 3 may be set so that ammonia hardly flows out from the NOx catalyst 3 when the NOx catalyst 3 is in a normal state and, at the same time, ammonia flows out from the NOx catalyst 3 when the NOx catalyst 3 is in an abnormal state.

As described above, by increasing a supply amount of ammonia, ammonia that flows out from the NOx catalyst 3 increases if the NOx catalyst 3 is in an abnormal state. If the NOx catalyst 3 is in a normal state, the NOx purification rate increases as the supply amount of ammonia increases. Therefore, concentrations of NOx and ammonia in exhaust gas that flows out from the NOx catalyst 3 decreases. On the other hand, if the NOx catalyst 3 is in an abnormal state, since ammonia adsorption performance has declined, ammonia that flows out from the NOx catalyst 3 increases as the supply amount of ammonia increases. Therefore, the output value of the downstream side NOx sensor 8 increases. Accordingly, since a difference in output values of the downstream side NOx sensor 8 between a normal state and an abnormal state of the NOx catalyst 3 increases, an accuracy of abnormality diagnosis can be improved.

In addition, an abnormality diagnosis of the NOx catalyst 3 according to the present embodiment can be used even when ammonia is not present in exhaust gas. In this case, it is assumed that there is no decline in the output value of the downstream side NOx sensor 8. In a similar manner, an abnormality diagnosis of the NOx catalyst 3 according to the present embodiment can be used even when an amount of ammonia supplied to the NOx catalyst 3 is smaller than usual. In this case, it is assumed that the amount of decline in output of the downstream side NOx sensor 8 is small.

Moreover, in the present embodiment, while a threshold of the output value of the downstream side NOx sensor 8 is corrected based on the amount of decline in output of the downstream side NOx sensor 8, alternatively, the output value of the downstream side NOx sensor 8 may be corrected based on the amount of decline in output of the downstream side NOx sensor 8. In other words, instead of correcting the threshold by subtracting the amount of decline in output B of the downstream side NOx sensor 8 which is calculated by assuming that the NOx catalyst 3 is in an abnormal state from the threshold, the output value of the downstream side NOx sensor 8 may be corrected by adding the amount of decline in output B to the output value of the downstream side NOx sensor 8. In addition, the output value of the downstream side NOx sensor 8 after correction may be set to a value obtained by adding "a value which is equal to or larger than the amount of decline in output B and, at the same time, which is equal to or smaller than a sum value of the amount of decline in output B and the amount of decline in output A" to "the output value before correction". In this case, the output value of the downstream side NOx sensor 8 is corrected instead of correcting the threshold in step S104 described above, and it is determined whether or not the output value of the downstream side NOx sensor 8 after correction is equal to or smaller than the threshold instead of determining whether or not the output value of the downstream side NOx sensor 8 is equal to or smaller than the threshold after correction in step S105 described above. Furthermore, in the present embodiment, while correction is performed by subtracting the amount of decline in output of the downstream side NOx sensor 8 from the threshold of the output value of the downstream side NOx sensor 8, alternatively, correction may be performed by multiplying the threshold of the output value of the downstream side NOx sensor 8 by a correction coefficient based on the amount of decline in output of the downstream side NOx sensor 8. In addition, correction may also be performed by multiplying the correction coefficient when correcting the output value of the downstream side NOx sensor 8.

As described above, in the present embodiment, by performing an abnormality diagnosis of the NOx catalyst 3 while taking into consideration of the fact that the output value of the downstream side NOx sensor 8 declines due to a reaction between NOx and ammonia at the downstream side NOx sensor 8, an accuracy of the abnormality diagnosis can be improved.

Second Embodiment

In the first embodiment, an abnormality diagnosis of the NOx catalyst 3 is performed by correcting a threshold in accordance with an amount of decline in output of the downstream side NOx sensor 8. On the other hand, in the present embodiment, it is determined whether or not an abnormality diagnosis of the NOx catalyst 3 is to be performed based on the amount of decline in output of the downstream side NOx sensor 8.

When performing an abnormality diagnosis of the NOx catalyst 3 by comparing the output value of the downstream side NOx sensor 8 and a threshold with each other, the larger the amount of decline in output of the downstream side NOx sensor 8, the smaller the threshold used for the abnormality diagnosis of the NOx catalyst 3. When the threshold becomes too small, the threshold approaches the output value of the downstream side NOx sensor 8 when the NOx catalyst 3 is in a normal state. In other words, due to the threshold being smaller, an actual output value of the downstream side NOx sensor 8 may become larger than the threshold despite the NOx catalyst 3 being in a normal state. Therefore, there is a risk that the NOx catalyst 3 is diagnosed to be in an abnormal state despite the NOx catalyst 3 being in a normal state.

When the amount of decline in output of the downstream side NOx sensor 8 is small, since the output value of the downstream side NOx sensor 8 assumes a value close to a value corresponding to an actual concentration, there is no need to correct the threshold. On the other hand, when the amount of decline in output of the downstream side NOx sensor 8 becomes large, an accuracy of diagnosis declines as described earlier. In consideration thereof, by performing an abnormality diagnosis of the NOx catalyst 3 only when the amount of decline in output of the downstream side NOx sensor 8 is equal to or smaller than a prescribed amount, a decline in accuracy of the abnormality diagnosis can be prevented. The prescribed amount is an upper limit value of the amount of decline in output of the downstream side NOx sensor 8 when an accuracy of an abnormality diagnosis of the NOx catalyst 3 is within an allowable range. In addition, when the amount of decline in output of the downstream side NOx sensor 8 is larger than the prescribed amount, an incorrect diagnosis can be prevented by prohibiting a diagnosis of the NOx catalyst 3.

Figure 10:
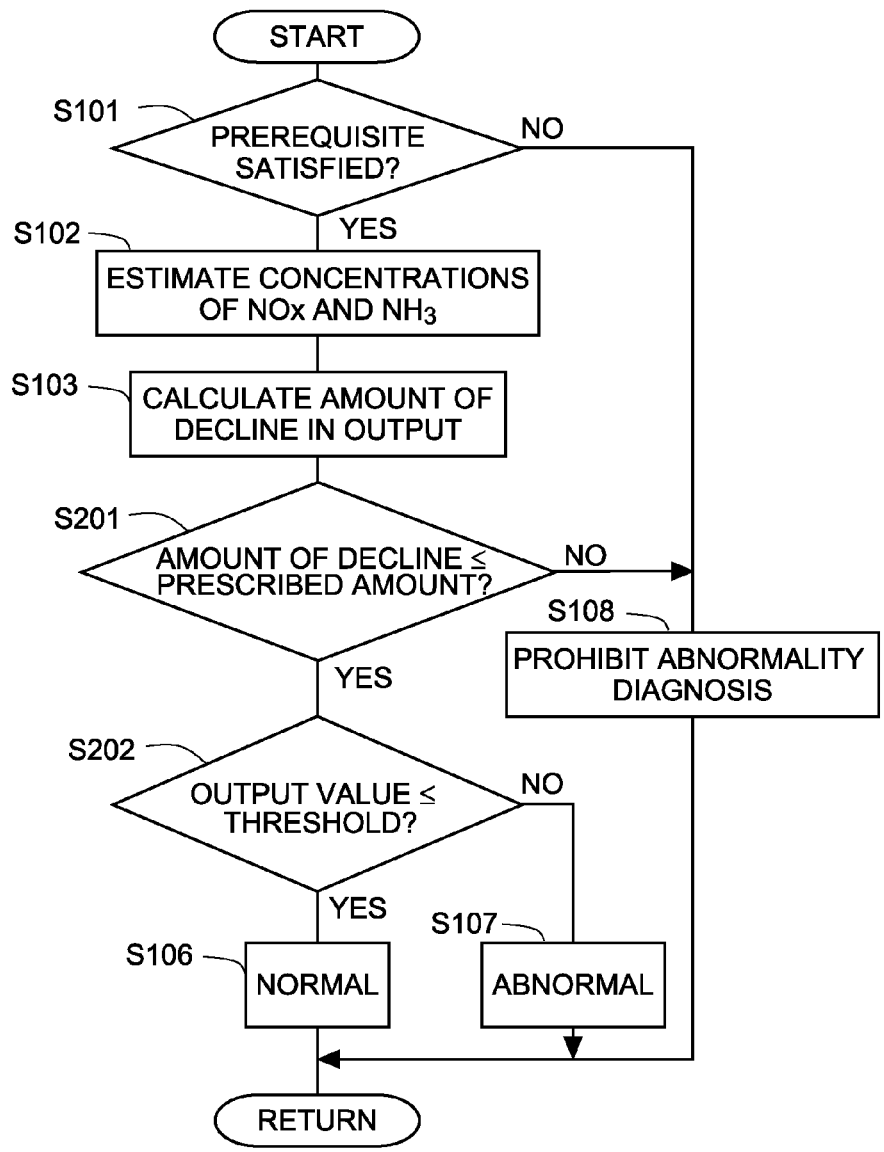
FIG. 10 is a flow chart indicating a flow of an abnormality diagnosis of a NOx catalyst according to a second embodiment.

FIG. 10 is a flow chart indicating a flow of an abnormality diagnosis of the NOx catalyst 3 according to the present embodiment. The present routine is executed every prescribed time by the ECU 10. Moreover, steps in which same processes as those in the routine described earlier are performed will be denoted by same reference characters and a description thereof will be omitted. In the present routine, step S201 is performed in place of step S104 in the routine described earlier.

In other words, in the present embodiment, step S201 is processed after step S103. In step S201, it is determined whether or not the amount of decline in output of the downstream side NOx sensor 8 calculated in step S103 is equal to or smaller than a prescribed value. The prescribed amount is an upper limit value of the amount of decline in output of the downstream side NOx sensor 8 when an accuracy of an abnormality diagnosis of the NOx catalyst 3 is within an allowable range. When a positive determination is made in step S201, the present routine advances to step S202, and when a negative determination is made, the present routine advances to step S108.

In step S202, it is determined whether or not the output value of the downstream side NOx sensor 8 is equal to or smaller than a threshold. In other words, a diagnosis of the NOx catalyst 3 is performed. This threshold is a value that has not been corrected based on the amount of decline in output of the downstream side NOx sensor 8. When a positive determination is made in step S202, the present routine proceeds to step S106 and a diagnosis is made that the NOx catalyst 3 is in a normal state. On the other hand, when a negative determination is made in step S202, the present routine proceeds to step S107 and a diagnosis is made that the NOx catalyst 3 is in an abnormal state. Moreover, in the present embodiment, the ECU that processes steps S201 and S108 corresponds to the diagnosis control unit according to the present invention, and the ECU 10 that processes steps S202, S106, and S107 corresponds to the diagnosing unit according to the present invention.

Figure 11:
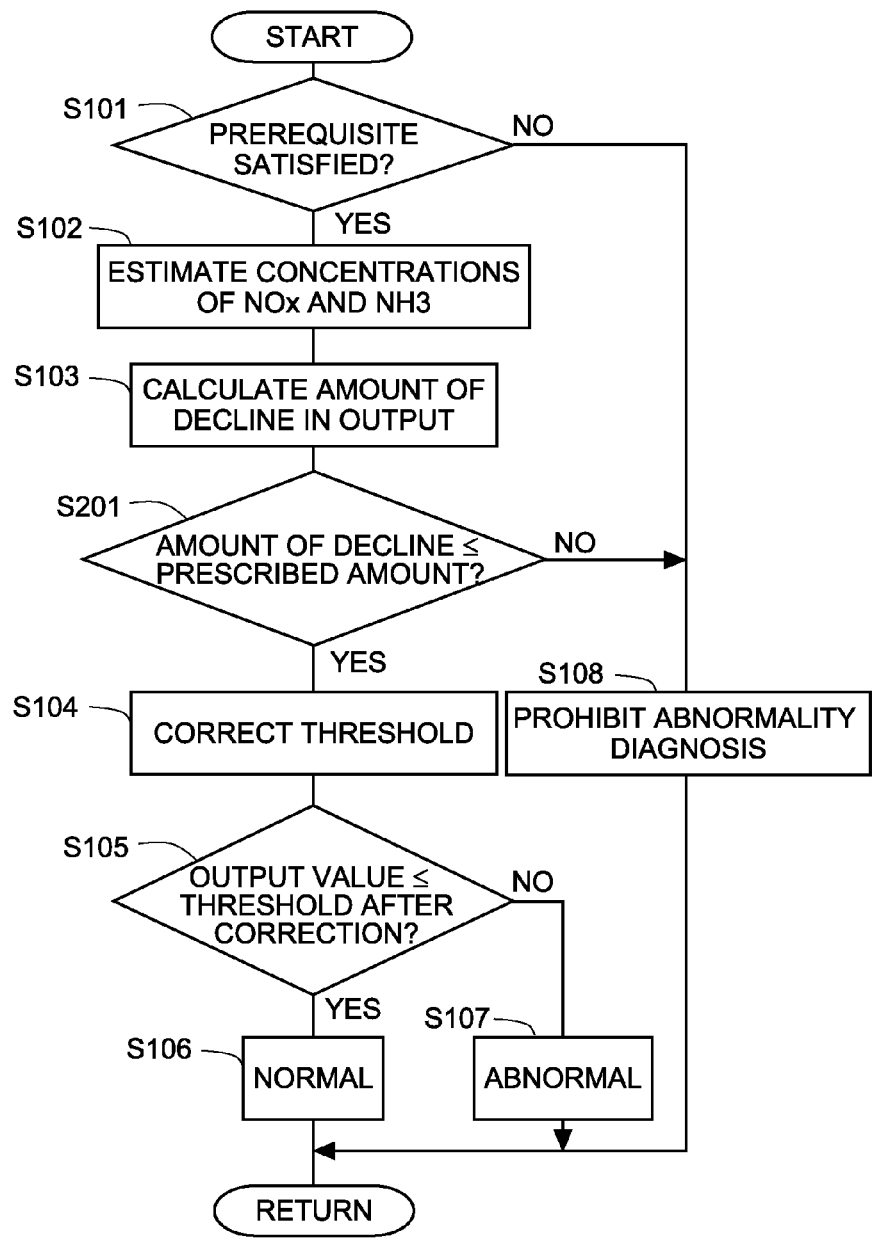
FIG. 11 is another flow chart indicating a flow of an abnormality diagnosis of a NOx catalyst according to the second embodiment.

Moreover, in the present embodiment, step S104 of the routine described earlier may be concurrently performed. FIG. 11 is another flow chart indicating a flow of an abnormality diagnosis of the NOx catalyst 3 according to the present embodiment. The present routine is executed every prescribed time by the ECU 10. Moreover, steps in which same processes as those in the routine described earlier are performed will be denoted by same reference characters and a description thereof will be omitted. In the present routine, steps S104 and S201 in the routines described earlier are performed. Subsequently, when a positive determination is made in step S201, the present routine advances to step S104, and when a negative determination is made, the present routine advances to step S108. In this case, the ECU 10 that processes steps S201, S104, and S108 corresponds to the diagnosis control unit according to the present invention, and the ECU 10 that processes steps S105, S106, and S107 corresponds to the diagnosing unit according to the present invention.

As described above, according to the present embodiment, by performing an abnormality diagnosis of the NOx catalyst 3 only when the amount of decline in output of the downstream side NOx sensor 8 due to a reaction between NOx and ammonia at the downstream side NOx sensor 8 is small, an accuracy of the abnormality diagnosis can be improved.

Third Embodiment

While an abnormality diagnosis of the NOx catalyst 3 is performed in the embodiment described above by comparing an output value of the downstream side NOx sensor 8 with a threshold of the output value, in the following embodiment, an abnormality diagnosis of the NOx catalyst 3 is performed by comparing a NOx purification rate at the NOx catalyst 3 with a threshold of the NOx purification rate.

The ECU 10 diagnoses that the NOx catalyst 3 is in an abnormal state when the NOx purification rate calculated based on the output value of the downstream side NOx sensor 8 is lower than a threshold and diagnoses that the NOx catalyst 3 is in a normal state when the NOx purification rate is equal to or higher than the threshold. The threshold of the NOx purification rate is the NOx purification rate when the NOx catalyst 3 is on a border between a normal state and an abnormal state. Alternatively, the threshold may be set to a lower limit value of the NOx purification rate when the NOx catalyst 3 is in a normal state. Moreover, the threshold may be provided with a certain amount of margin.

A NOx purification rate is a ratio of a NOx concentration that decreases due to purification by the NOx catalyst 3 with respect to a NOx concentration in exhaust gas that flows into the NOx catalyst 3. The NOx concentration that decreases due to purification by the NOx catalyst 3 is a value obtained by subtracting a NOx concentration in exhaust gas that flows out from the NOx catalyst 3 from a NOx concentration in exhaust gas that flows into the NOx catalyst 3. In addition, the NOx concentration in exhaust gas that flows into the NOx catalyst 3 can be detected based on the upstream side NOx sensor 7 or estimated based on an operating state of the internal combustion engine 1. Furthermore, the NOx concentration in exhaust gas that flows out from the NOx catalyst 3 is detected based on the downstream side NOx sensor 8. Therefore, the calculated NOx purification rate is also influenced by ammonia in exhaust gas.

When an abnormality diagnosis of the NOx catalyst 3 is performed when NOx and ammonia are contained in exhaust gas, due to the decrease in NOx and ammonia at the electrode of the downstream side NOx sensor 8, there is a risk that the NOx purification rate calculated based on the output value of the downstream side NOx sensor 8 may equal or exceed the threshold despite the NOx catalyst 3 being in an abnormal state. In other words, there is a risk that the NOx catalyst 3 is diagnosed to be in a normal state despite being in an abnormal state. In consideration thereof, when NOx and ammonia are contained in exhaust gas, the ECU 10 obtains the amount of decline in output of the downstream side NOx sensor 8 in accordance with concentrations of NOx and ammonia and corrects the threshold when performing an abnormality diagnosis of the NOx catalyst 3 based on the amount of decline in output. Since the output value of the downstream side NOx sensor 8 declines due to the reaction between NOx and ammonia, the NOx purification rate calculated based on the output value of the downstream side NOx sensor 8 becomes higher than an actual NOx purification rate. Therefore, by increasing the threshold of the NOx purification rate by an amount corresponding to an increase in the NOx purification rate due to the influences of NOx and ammonia, an accuracy of an abnormality diagnosis of the NOx catalyst 3 can be improved.

Figure 12:
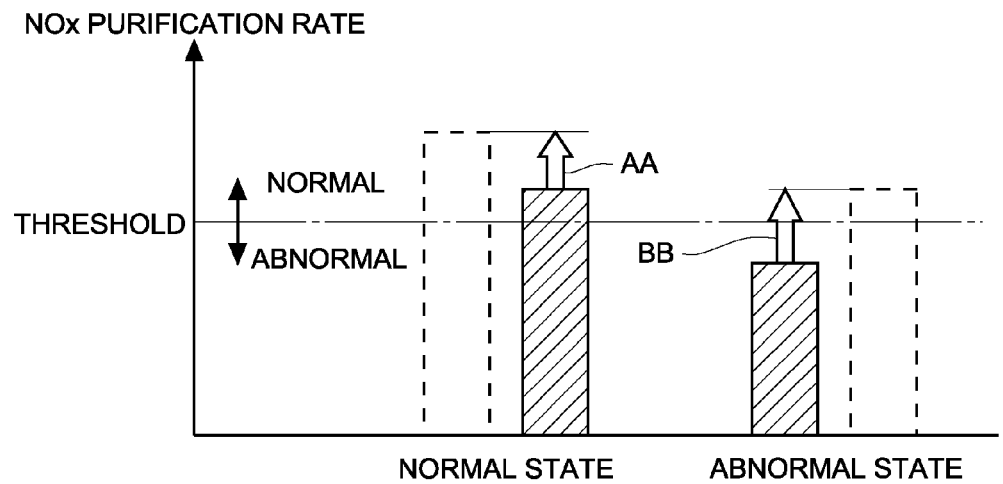
FIG. 12 is a diagram indicating NOx purification rates in a normal state and an abnormal state of a NOx catalyst.

FIG. 12 is a diagram showing NOx purification rates in a normal state and an abnormal state of the NOx catalyst 3. A solid line depicts an actual NOx purification rate of the NOx catalyst 3. In addition, a dashed line depicts a NOx purification rate calculated based on the output value of the downstream side NOx sensor 8 when NOx and ammonia react with each other at the downstream side NOx sensor 8.

The threshold in FIG. 12 is a threshold for diagnosing whether the NOx catalyst 3 is in a normal state or an abnormal state. When the NOx purification rate is equal to or higher than the threshold, it is diagnosed that the NOx catalyst 3 is in a normal state, and when the NOx purification rate is lower than the threshold, it is diagnosed that the NOx catalyst 3 is in an abnormal state. Moreover, the threshold shown in FIG. 12 is a threshold before correction. Since the threshold before correction is related to an operating state of the internal combustion engine 1 (for example, an engine rotational speed and an engine load), a relationship between the operating state of the internal combustion engine 1 and the threshold can be obtained by an experiment, a simulation, or the like in advance. Moreover, since the NOx purification rate also changes in accordance with a temperature of the NOx catalyst 3 and a flow velocity of exhaust gas passing through the NOx catalyst 3, the threshold may be set in consideration of these influences.

In FIG. 12, an amount of rise from an actual NOx purification rate of the NOx purification rate calculated based on the output value of the downstream side NOx sensor 8 is denoted by AA when the NOx catalyst 3 is in a normal state and by BB when the NOx catalyst 3 is in an abnormal state.

As described above, the ECU 10 diagnoses that the NOx catalyst 3 is in an abnormal state when the NOx purification rate calculated based on the output value of the downstream side NOx sensor 8 is lower than a threshold. In addition, when the NOx catalyst 3 is in a normal state, since the NOx purification rate remains equal to or higher than the threshold even if the NOx purification rate rises, it can be diagnosed that the NOx catalyst 3 is in a normal state in an accurate manner. On the other hand, when the NOx catalyst 3 is in an abnormal state, amounts of NOx and ammonia which flow out from the NOx catalyst 3 increase. Therefore, since the amount of decline in output of the downstream side NOx sensor 8 increases and the amount of rise of the NOx purification rate increases, the calculated NOx purification rate may become higher than the threshold. As a result, there is a risk that an erroneous diagnosis of the NOx catalyst 3 being in a normal state may be made despite the NOx catalyst 3 being in an abnormal state. In comparison, in the present embodiment, the threshold is corrected in accordance with the amount of decline in output of the downstream side NOx sensor 8.

Figure 13:
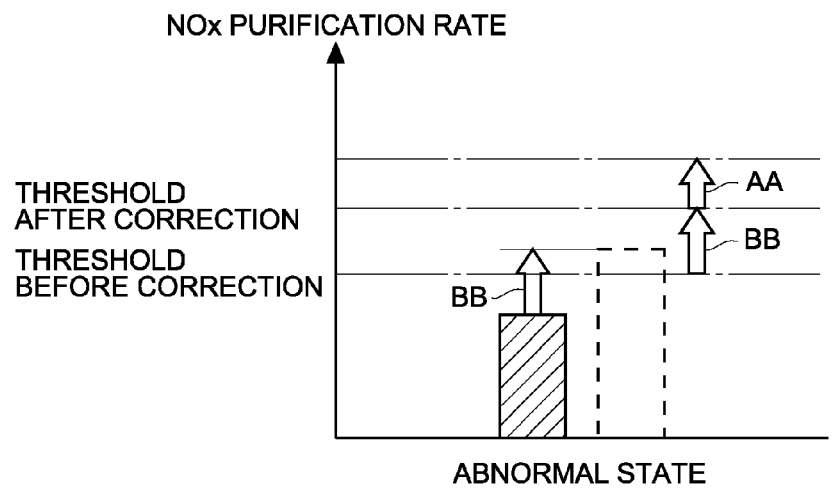
FIG. 13 is a diagram showing a relationship between a threshold before correction and a threshold after correction.

FIG. 13 is a diagram indicating a relationship between a threshold before correction and a threshold after correction. The threshold after correction is set to a larger value than the threshold before correction. The threshold before correction is set as a lower limit value of the NOx purification rate when the NOx catalyst 3 is in a normal state. In other words, the threshold before correction is the NOx purification rate of the NOx catalyst 3 when a degree of deterioration of the NOx catalyst 3 is within an allowable range. On the other hand, the threshold after correction is determined based on an amount of rise BB of the NOx purification rate which is calculated by assuming that the NOx catalyst 3 is in an abnormal state. The amount of rise BB of the NOx purification rate is a ratio of the amount of decline in output B of the downstream side NOx sensor 8 when assuming that the NOx catalyst 3 is in an abnormal state to a NOx concentration in exhaust gas that flows into the NOx catalyst 3. For example, assuming that the NOx catalyst 3 is in an abnormal state, concentrations of NOx and ammonia in exhaust gas that flows out from the NOx catalyst 3 are estimated. Subsequently, based on the estimated values of the concentrations of NOx and ammonia, the amount of decline in output B of the downstream side NOx sensor 8 is calculated. Since a decline in output of the downstream side NOx sensor 8 becomes prominent when assuming that the NOx catalyst 3 is in an abnormal state, by correcting the threshold based on the amount of decline in output, an accuracy of an abnormality diagnosis of the NOx catalyst 3 can be increased.

For example, the threshold after correction can be set to a value obtained by adding "the amount of rise BB of the NOx purification rate which is calculated by assuming that the NOx catalyst 3 is in an abnormal state" to "the threshold before correction". In this manner, the amount of rise BB of the NOx purification rate which is calculated by assuming that the NOx catalyst 3 is in an abnormal state can be adopted as the threshold correction amount.

Moreover, "the amount of rise of the NOx purification rate which is calculated by assuming that the NOx catalyst 3 is in an abnormal state" may be replaced by "an amount of rise of the NOx purification rate which is calculated by assuming that a degree of deterioration of the NOx catalyst 3 is a prescribed degree of deterioration exceeding an allowable range" or by "an amount of rise of the NOx purification rate which is calculated by assuming that the NOx catalyst 3 is on a border between a normal state and an abnormal state".

Alternatively, a sum value (AA+BB) of "the amount of rise BB of the NOx purification rate which is calculated by assuming that the NOx catalyst 3 is in an abnormal state" and "an amount of rise AA of the NOx purification rate which is calculated by assuming that the NOx catalyst 3 is in a normal state" may be adopted as the threshold correction amount. In other words, the threshold after correction may be set to a value obtained by adding the sum value (AA+BB) to the threshold before correction. For example, assuming that the NOx catalyst 3 is in a normal state, concentrations of NOx and ammonia in exhaust gas that flows out from the NOx catalyst 3 are estimated. In addition, based on the estimated values of the concentrations of NOx and ammonia, the amount of decline in output A of the downstream side NOx sensor 8 is calculated and, subsequently, the amount of rise AA of the NOx purification rate is calculated based on the amount of decline in output A of the downstream side NOx sensor 8.

The threshold of the NOx purification rate should be set to be larger than the NOx purification rate when the NOx catalyst 3 is in an abnormal state and, at the same time, to be equal to or smaller than the NOx purification rate when the NOx catalyst 3 is in a normal state. The amount of decline in output of the downstream side NOx sensor 8 changes in accordance with operating conditions of the internal combustion engine 1 and the like. In addition, when the threshold is connected solely based on the amount of rise BB of the NOx purification rate which is calculated by assuming that the NOx catalyst 3 is in an abnormal state, depending on the operating conditions of the internal combustion engine 1 and the like, the threshold after correction may become larger than the NOx purification rate which is calculated by assuming that the NOx catalyst 3 is in a normal state. In this case, the threshold of the NOx purification rate cannot be set to be larger than the NOx purification rate when the NOx catalyst 3 is in an abnormal state and, at the same time, to be equal to or smaller than the NOx purification rate when the NOx catalyst 3 is in a normal state. In comparison, the threshold can be set to the range described above by further taking into consideration the amount of rise AA of the NOx purification rate which is calculated by assuming that the NOx catalyst 3 is in a normal state. In addition, a larger threshold is preferable in order to prevent an erroneous determination that the NOx catalyst 3 is in a normal state despite the NOx catalyst 3 being in an abnormal state. Therefore, by further taking into consideration the amount of rise AA of the NOx purification rate and further increasing the threshold, an erroneous determination that the NOx catalyst 3 is in a normal state despite the NOx catalyst 3 being in an abnormal state can be prevented.

In addition, the threshold correction amount may be set to a value which is equal to or larger than "the amount of rise BB of the NOx purification rate which is calculated by assuming that the NOx catalyst 3 is in an abnormal state" and, at the same time, which is equal to or smaller than "the sum value (AA+BB)". In other words, the threshold correction amount may be set so as to satisfy the relationship provided below.

$BB \leq \text{threshold correction amount} \leq AA+BB$

By correcting the threshold as described above, when the NOx catalyst 3 is in a normal state, the NOx purification rate calculated based on the output value of the downstream side NOx sensor 8 becomes equal to or higher than the threshold after correction. Therefore, it can be diagnosed that the NOx catalyst 3 is in a normal state. In addition, when the NOx catalyst 3 is in an abnormal state, the NOx purification rate calculated based on the output value of the downstream side NOx sensor 8 becomes lower than the threshold after correction. Therefore, it can be diagnosed that the NOx catalyst 3 is in an abnormal state.

Figure 14:
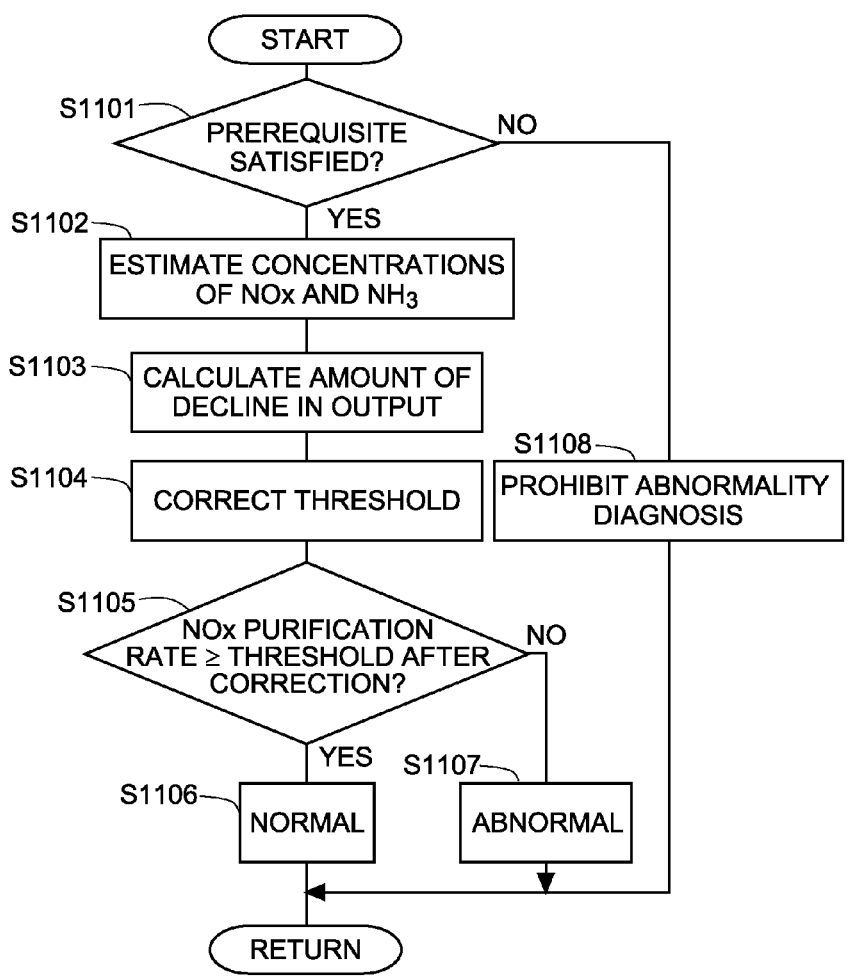
FIG. 14 is a flow chart indicating a flow of an abnormality diagnosis of a NOx catalyst according to a third embodiment.

FIG. 14 is a flow chart indicating a flow of an abnormality diagnosis of the NOx catalyst 3 according to the present embodiment. The present routine is executed every prescribed time by the ECU 10.

In step S1101, it is determined whether or not a prerequisite for performing an abnormality detection of the NOx catalyst 3 is satisfied. In the present step, it is determined whether or not a state exists where an abnormality diagnosis of the NOx catalyst 3 can be accurately performed. For example, the existence of a state where a purification rate of NOx is high when the NOx catalyst 3 is in a normal state and, at the same time, where NOx and ammonia are detected at the downstream side NOx sensor 8 is adopted as the prerequisite. For example, the prerequisite for performing an abnormality diagnosis of the NOx catalyst 3 is determined to be satisfied when all of the following is true: the NOx catalyst 3 is activated; the downstream side NOx sensor 8 is activated; and warming up of the internal combustion engine 1 has been completed. A temperature of the NOx catalyst 3 can be detected by the temperature sensor 9. In addition, whether or not the downstream side NOx sensor 8 is activated can be determined using known techniques. Furthermore, in the present step, ammonia or an ammonia precursor being supplied from the injection valve 4 can be added to the prerequisite. When a positive determination is made in step S1101, the present routine advances to step S1102, and when a negative determination is made, the present routine advances to step S1108.

In step S1102, concentrations of NOx and ammonia which flow out from the NOx catalyst 3 are estimated. The concentrations of NOx and ammonia are values obtained based on an operating state of the internal combustion engine 1 or the like and are values which assume that the NOx catalyst 3 is in an abnormal state. Alternatively, values which assume that the NOx catalyst 3 is in a normal state may be estimated. Moreover, in the present embodiment, the ECU 10 that processes step S1102 corresponds to the NOx concentration estimating unit and the ammonia concentration estimating unit according to the present invention.

In step S1103, the amount of decline in output of the downstream side NOx sensor 8 is calculated. The amount of decline in output is calculated according to Equation 4 provided earlier based on estimated values of the concentrations of NOx and ammonia which flow out from the NOx catalyst 3 which are estimated in step S1102.

Equation 4 and the coefficients k1, k2, and k3 are to be obtained by an experiment, a simulation, or the like and stored in the ECU 10 in advance. In the present step, the amount of decline in output of the downstream side NOx sensor 8 when assuming that the NOx catalyst 3 is in a normal state may be further calculated. Moreover, in the present embodiment, the ECU 10 that processes step S1103 corresponds to the calculating unit according to the present invention.

In step S1104, the threshold used when performing an abnormality diagnosis of the NOx catalyst 3 is corrected based on the amount of decline in output of the downstream side NOx sensor 8 calculated in step S1103. The threshold before correction is to be obtained by an experiment, a simulation, or the like in advance. In addition, the threshold after correction can be calculated by adding the amount of rise BB of the NOx purification rate calculated based on the amount of decline in output B of the downstream side NOx sensor 8 which is calculated by assuming that the NOx catalyst 3 is in an abnormal state to the threshold before correction. Moreover, the threshold after correction may be set to a value obtained by adding "a sum value (AA+BB) of the amount of rise BB of the NOx purification rate which is calculated by assuming that the NOx catalyst 3 is in an abnormal state and the amount of rise AA of the NOx purification rate which is calculated by assuming that the NOx catalyst 3 is in a normal state" to "the threshold before correction". In addition, the threshold after correction may be set to a value obtained by adding a value which is equal to or larger than "the amount of rise BB of the NOx purification rate which is calculated by assuming that the NOx catalyst 3 is in an abnormal state" and, at the same time, which is equal to or smaller than "the sum value (AA+BB)" to the "threshold before correction".

In step S1105, it is determined whether or not the NOx purification rate calculated based on the output value of the downstream side NOx sensor 8 is equal to or higher than the threshold after correction. In other words, an abnormality diagnosis of the NOx catalyst 3 is performed. When a positive determination is made in step S1105, the present routine proceeds to step S1106 and a diagnosis is made that the NOx catalyst 3 is in a normal state. On the other hand, when a negative determination is made in step S1105, the present routine proceeds to step S1107 and a diagnosis is made that the NOx catalyst 3 is in an abnormal state. Moreover, in the present embodiment, the ECU 10 that processes step S1104 corresponds to the diagnosis control unit according to the present invention, and the ECU 10 that processes steps S1105, S1106, and S1107 corresponds to the diagnosing unit according to the present invention.

On the other hand, in step S1108, since a state suitable for an abnormality diagnosis of the NOx catalyst 3 does not exist, an abnormality diagnosis of the NOx catalyst 3 is prohibited. In other words, an abnormality diagnosis of the NOx catalyst 3 is not performed. Not performing an abnormality diagnosis includes, for example, the ECU 10 reading the output value of the downstream side NOx sensor 8 but not performing an abnormality diagnosis using the output value. In addition, not performing an abnormality diagnosis includes, for example, the ECU 10 performing an abnormality diagnosis based on the output value of the NOx sensor 8 but canceling a result of the diagnosis. Furthermore, not performing an abnormality diagnosis includes, for example, the ECU 10 not reading the output value of the downstream side NOx sensor 8.

Moreover, the output value of the downstream side NOx sensor 8 may sometimes be corrected using a correction coefficient that is determined in accordance with a temperature or a flow velocity of exhaust gas. In such a case, the correction coefficient of the output value of the downstream side NOx sensor 8 may be corrected instead of correcting the coefficient.

Moreover, the abnormality diagnosis of the NOx catalyst 3 according to the present embodiment can be performed even in a situation where, for example, ammonia flows out from the NOx catalyst 3. Therefore, when performing an abnormality diagnosis of the NOx catalyst 3, a larger amount of ammonia than usual may be supplied to the NOx catalyst 3. In this case, usual refers to a case where an abnormality diagnosis of the NOx catalyst 3 is not performed. Alternatively, usual may be assumed to be a case where ammonia is supplied in accordance with NOx flowing into the NOx catalyst 3 in order to purify the NOx at the NOx catalyst 3. In other words, while the ECU 10 supplies ammonia in an amount in accordance with an amount of NOx that flows into the NOx catalyst 3 in order to reduce NOx, the ECU 10 may supply a larger amount of ammonia when performing an abnormality diagnosis. In addition, an amount of ammonia when performing an abnormality diagnosis of the NOx catalyst 3 may be set so that ammonia hardly flows out from the NOx catalyst 3 when the NOx catalyst 3 is in a normal state and, at the same time, ammonia flows out from the NOx catalyst 3 when the NOx catalyst 3 is in an abnormal state.

As described above, by increasing a supply amount of ammonia, ammonia that flows out from the NOx catalyst 3 increases if the NOx catalyst 3 is in an abnormal state. If the NOx catalyst 3 is in a normal state, the NOx purification rate increases as the supply amount of ammonia increases. Therefore, concentrations of NOx and ammonia in exhaust gas that flows out from the NOx catalyst 3 decreases. On the other hand, if the NOx catalyst 3 is in an abnormal state, since ammonia adsorption performance has declined, ammonia that flows out from the NOx catalyst 3 increases as the supply amount of ammonia increases. Therefore, the output value of the downstream side NOx sensor 8 increases and a calculated NOx purification rate decreases. Accordingly, since a difference in NOx purification rates between a normal state and an abnormal state of the NOx catalyst 3 increases, an accuracy of abnormality diagnosis can be improved.

In addition, an abnormality diagnosis of the NOx catalyst 3 according to the present embodiment can be used even when ammonia is not present in exhaust gas. In this case, it is assumed that there is no decline in the output value of the downstream side NOx sensor 8. In a similar manner, an abnormality diagnosis of the NOx catalyst 3 according to the present embodiment can be used even when an amount of ammonia supplied to the NOx catalyst 3 is smaller than usual. In this case, it is assumed that the amount of decline in output of the downstream side NOx sensor 8 is small.

Moreover, in the present embodiment, while a threshold of the NOx purification rate is corrected based on the amount of rise of the NOx purification rate, alternatively, a calculated NOx purification rate may be corrected based on the amount of rise of the NOx purification rate. In other words, instead of correcting the threshold by adding the amount of rise BB of the NOx purification rate which is calculated by assuming that the NOx catalyst 3 is in an abnormal state to the threshold, the NOx purification rate may be corrected by subtracting the amount of rise BB of the NOx purification rate from the calculated NOx purification rate. In addition, the NOx purification rate after correction may be set to a value obtained by subtracting a value which is equal to or larger than "the amount of rise BB of the NOx purification rate which is calculated by assuming that the NOx catalyst 3 is in an abnormal state" and, at the same time, which is equal to or smaller than "the sum value (AA+BB)" from the "NOx purification rate before correction". In this case, the NOx purification rate is corrected instead of correcting the threshold in step S1104 described earlier, and it is determined whether or not the NOx purification rate after correction is equal to or higher than the threshold instead of determining whether or not the NOx purification rate is equal to or higher than the threshold after correction in step S1105 described earlier. In addition, in the present embodiment, while correction is performed by adding the amount of rise of the NOx purification rate to the threshold of the NOx purification rate, alternatively, correction may be performed by multiplying the threshold of the NOx purification rate by a correction coefficient based on the amount of rise of the NOx purification rate or the amount of decline in output of the downstream side NOx sensor 8. Furthermore, correction may also be performed by multiplying the correction coefficient when correcting the NOx purification rate.

As described above, in the present embodiment, by performing an abnormality diagnosis of the NOx catalyst 3 while taking into consideration of the fact that the output value of the downstream side NOx sensor 8 declines due to a reaction between NOx and ammonia at the downstream side NOx sensor 8, an accuracy of the abnormality diagnosis can be improved.

Fourth Embodiment

In the third embodiment, an abnormality diagnosis of the NOx catalyst 3 is performed by correcting a threshold in accordance with an amount of rise of a NOx purification rate. On the other hand, in the present embodiment, it is determined whether or not an abnormality diagnosis of the NOx catalyst 3 is to be performed based on the amount of rise of the NOx purification rate.

When performing an abnormality diagnosis of the NOx catalyst 3 by comparing the NOx purification rate calculated based on the output value of the downstream side NOx sensor 8 and a threshold with each other, the larger the amount of decline in output of the downstream side NOx sensor 8, the larger the amount of rise of the NOx purification rate and, consequently, the larger the threshold used for the abnormality diagnosis of the NOx catalyst 3. When the threshold becomes too large, the threshold approaches the NOx purification rate in a normal state of the NOx catalyst 3. In other words, due to an increased threshold, the calculated NOx purification rate may become lower than the threshold despite the NOx catalyst 3 being in a normal state. Therefore, there is a risk that the NOx catalyst 3 is diagnosed to be in an abnormal state despite the NOx catalyst 3 being in a normal state.

When the amount of decline in output of the downstream side NOx sensor 8 is small, since the output value of the downstream side NOx sensor 8 assumes a value close to a value corresponding to an actual concentration, there is no need to correct the threshold. On the other hand, when the amount of decline in output of the downstream side NOx sensor 8 becomes large and the amount of rise of the NOx purification rate increases, an accuracy of diagnosis declines as described earlier. In consideration thereof, by performing an abnormality diagnosis of the NOx catalyst 3 only when the amount of rise of the NOx purification rate is equal to or smaller than a prescribed amount, a decline in accuracy of the abnormality diagnosis can be prevented. The prescribed amount is an upper limit value of the amount of rise of the NOx purification rate when an accuracy of an abnormality diagnosis of the NOx catalyst 3 is within an allowable range. In addition, when the amount of rise of the NOx purification rate is larger than the prescribed amount, an incorrect diagnosis can be prevented by prohibiting a diagnosis of the NOx catalyst 3.

Figure 15:
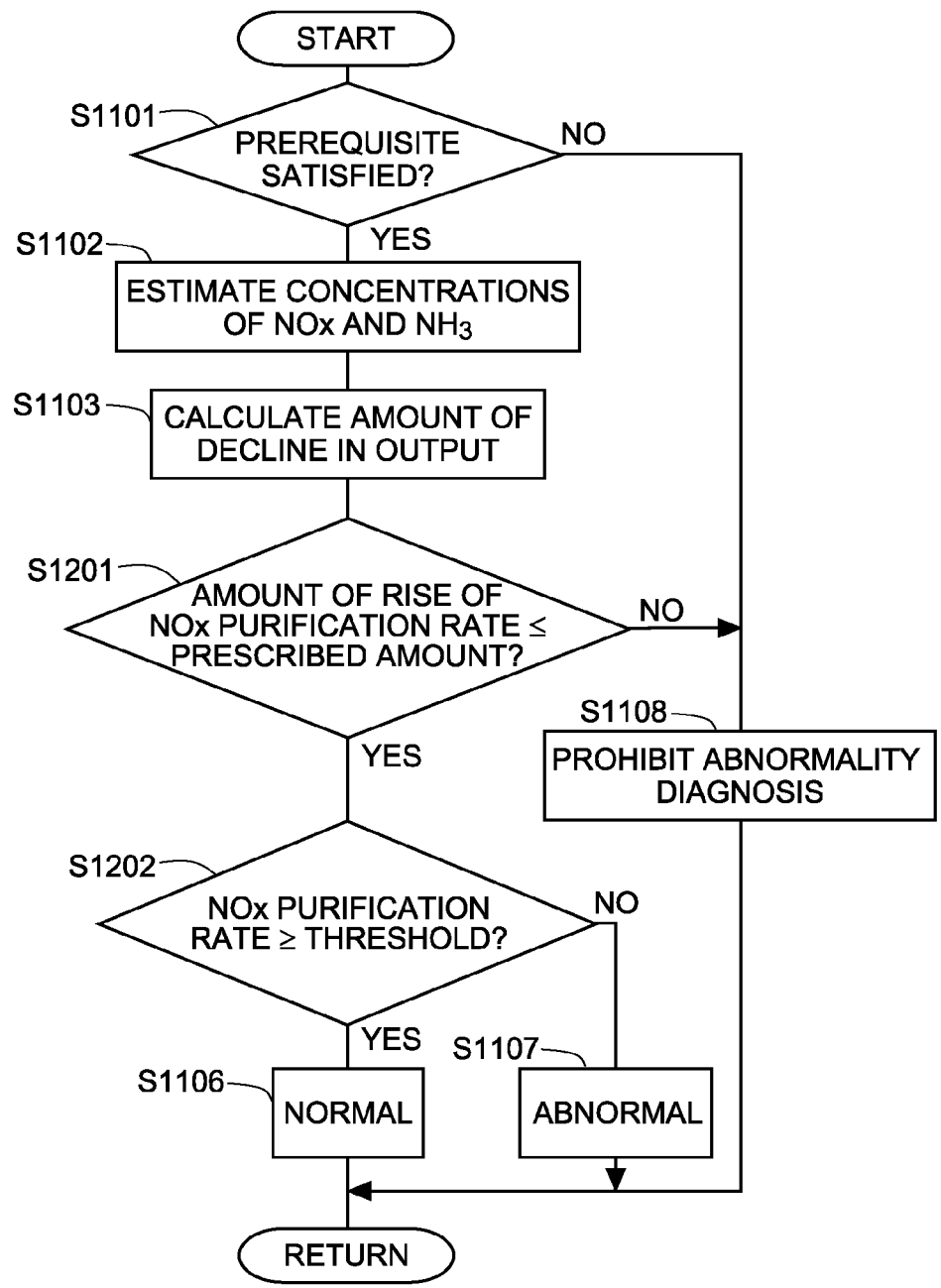
FIG. 15 is a flow chart indicating a flow of an abnormality diagnosis of a NOx catalyst according to a fourth embodiment.

FIG. 15 is a flow chart indicating a flow of an abnormality diagnosis of the NOx catalyst 3 according to the present embodiment. The present routine is executed every prescribed time by the ECU 10. Moreover, steps in which same processes as those in the routine described earlier are performed will be denoted by same reference characters and a description thereof will be omitted. In the present routine, step S1201 is performed in place of step S1104 in the routine described earlier.

In other words, in the present embodiment, step S1201 is processed after step S1103. In step S1201, it is determined whether or not the amount of rise of the NOx purification rate calculated based on the amount of decline in output of the downstream side NOx sensor 8 calculated in step S1103 is equal to or smaller than a prescribed value. The prescribed amount is an upper limit value of the amount of rise of the NOx purification rate when an accuracy of an abnormality diagnosis of the NOx catalyst 3 is within an allowable range. When a positive determination is made in step S1201, the present routine advances to step S1202, and when a negative determination is made, the present routine advances to step S1108.

In step S1202, it is determined whether or not the NOx purification rate calculated based on the output value of the downstream side NOx sensor 8 is equal to or higher than a threshold. In other words, a diagnosis of the NOx catalyst 3 is performed. This threshold is a value that has not been corrected based on the amount of decline in output of the downstream side NOx sensor 8. When a positive determination is made in step S1202, the present routine proceeds to step S1106 and a diagnosis is made that the NOx catalyst 3 is in a normal state. On the other hand, when a negative determination is made in step S1202, the present routine proceeds to step S1107 and a diagnosis is made that the NOx catalyst 3 is in an abnormal state. Moreover, in the present embodiment, the ECU that processes steps S1201 and S1108 corresponds to the diagnosis control unit according to the present invention, and the ECU 10 that processes steps S1202, S1106, and S1107 corresponds to the diagnosing unit according to the present invention.

Figure 16:
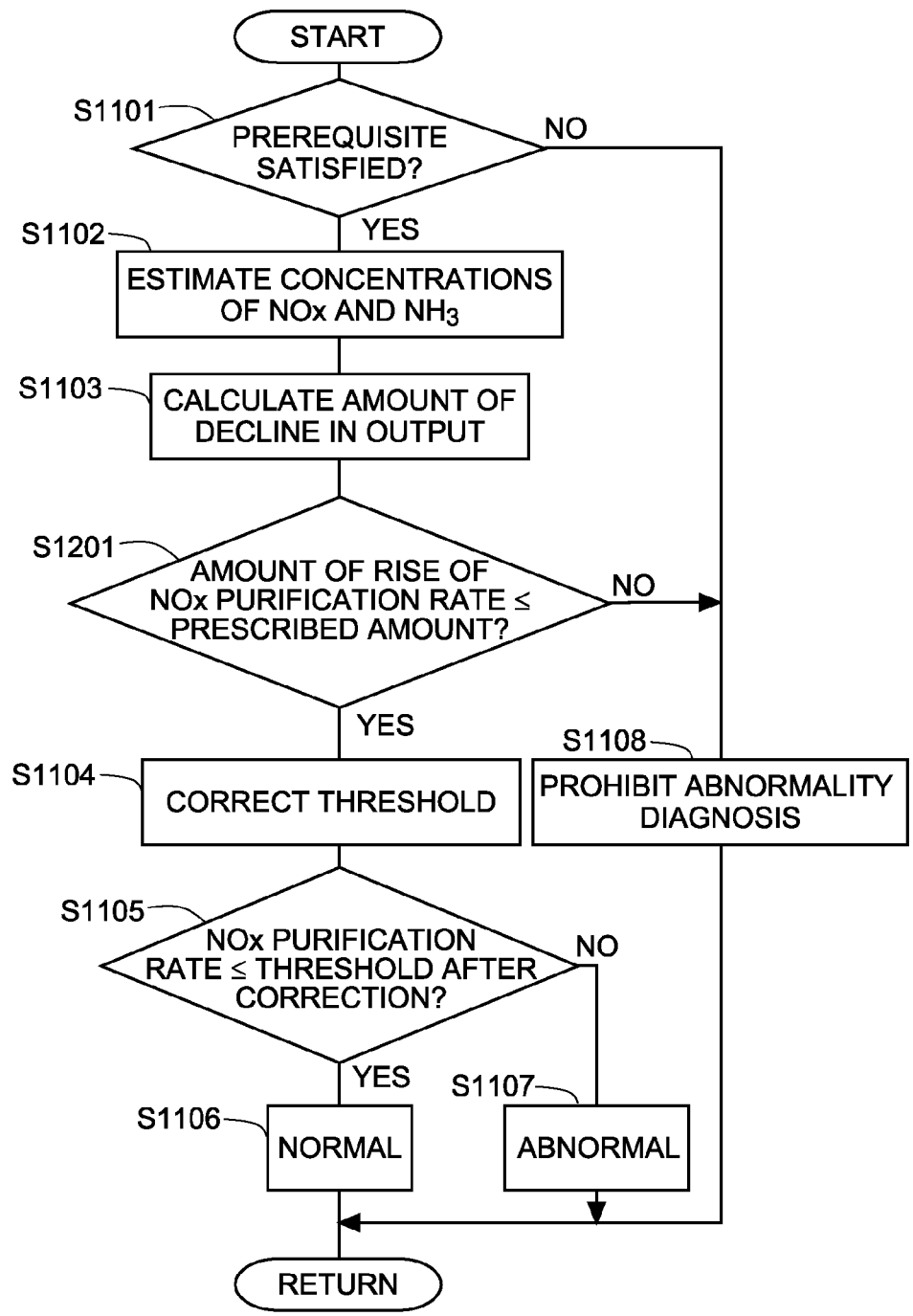
FIG. 16 is another flow chart indicating a flow of an abnormality diagnosis of a NOx catalyst according to the fourth embodiment.

Moreover, in the present embodiment, step S1104 of the routine described earlier may be concurrently performed. FIG. 16 is another flow chart indicating a flow of an abnormality diagnosis of the NOx catalyst 3 according to the present embodiment. The present routine is executed every prescribed time by the ECU 10. Moreover, steps in which same processes as those in the routine described earlier are performed will be denoted by same reference characters and a description thereof will be omitted. In the present routine, steps S1104 and S1201 in the routines described earlier are performed. In other words, when a positive determination is made in step S1201, the present routine advances to step S1104, and when a negative determination is made, the present routine advances to step S1108. In this case, the ECU 10 that processes steps S1201, S1104, and S1108 corresponds to the diagnosis control unit according to the present invention, and the ECU 10 that processes steps S1105, S1106, and S1107 corresponds to the diagnosing unit according to the present invention.

As described above, according to the present embodiment, by performing an abnormality diagnosis of the NOx catalyst 3 only when the amount of rise of the NOx purification rate due to a reaction between NOx and ammonia at the downstream side NOx sensor 8 is small, an accuracy of the abnormality diagnosis can be improved.

REFERENCE SIGNS LIST

1 Internal combustion engine
2 Exhaust passage
3 Selective catalytic reduction NOx catalyst
4 Injection valve
5 Intake passage
6 Throttle
7 Upstream side NOx sensor
8 Downstream side NOx sensor
9 Temperature sensor
10 ECU
11 Crank position sensor
12 Accelerator depression amount sensor
15 Air flow meter

The invention claimed is:

1. An abnormality diagnosis apparatus for an exhaust gas purification apparatus of an internal combustion engine, the exhaust gas purification apparatus including:
   a selective catalytic reduction NOx catalyst which is provided in an exhaust passage of the internal combustion engine and which uses ammonia as a reducing agent;
   a supplying unit which supplies ammonia or an ammonia precursor into exhaust gas that flows into the selective catalytic reduction NOx catalyst on an upstream side of the selective catalytic reduction NOx catalyst; and
   a sensor which is provided on a downstream side of the selective catalytic reduction NOx catalyst, which detects NOx and ammonia in exhaust gas flowing out from the selective catalytic reduction NOx catalyst, and at which NOx and ammonia react with each other,
   the abnormality diagnosis apparatus for the exhaust gas purification apparatus comprising:
   a NOx concentration estimating unit configured to estimate a NOx concentration in the exhaust gas flowing out from the selective catalytic reduction NOx catalyst;
   an ammonia concentration estimating unit configured to estimate an ammonia concentration in the exhaust gas flowing out from the selective catalytic reduction NOx catalyst;
   a calculating unit configured to calculate an amount of decline in output of the sensor due to a reaction between NOx and ammonia at the sensor, based on the NOx concentration estimated by the NOx concentration estimating unit and the ammonia concentration estimated by the ammonia concentration estimating unit;
   a diagnosing unit configured to perform a diagnosis of the selective catalytic reduction NOx catalyst based on an output value of the sensor; and
   a diagnosis control unit configured to control a diagnosis by the diagnosing unit based on the amount of decline in output of the sensor as calculated by the calculating unit.

2. The abnormality diagnosis apparatus for the exhaust gas purification apparatus according to claim 1, wherein
   the diagnosis control unit is configured to:
   make the diagnosing unit perform an abnormality diagnosis of the selective catalytic reduction NOx catalyst when an amount of rise of a NOx purification rate calculated based on the amount of decline in output of the sensor as calculated by the calculating unit is equal to or smaller than a prescribed amount; and make the diagnosing unit not perform an abnormality diagnosis of the selective catalytic reduction NOx catalyst when the amount of rise of the NOx purification rate calculated based on the amount of decline in output of the sensor as calculated by the calculating unit is larger than the prescribed amount.

3. The abnormality diagnosis apparatus for the exhaust gas purification apparatus according to claim 1, wherein the diagnosing unit is configured to:

diagnose that the selective catalytic reduction NOx catalyst is in a normal state when a NOx purification rate calculated based on an output value of the sensor is equal to or higher than a threshold; and diagnose that the selective catalytic reduction NOx catalyst is in an abnormal state when the NOx purification rate calculated based on the output value of the sensor is lower than the threshold, and the diagnosis control unit is configured to correct the threshold or the NOx purification rate based on the amount of decline in output of the sensor as calculated by the calculating unit.

4. The abnormality diagnosis apparatus for the exhaust gas purification apparatus according to claim 3, wherein the diagnosis control unit is configured to correct the threshold by adding an amount of rise of a NOx purification rate calculated based on the amount of decline in output to the threshold.

5. The abnormality diagnosis apparatus for the exhaust gas purification apparatus according to claim 3, wherein the diagnosis control unit is configured to correct a NOx purification rate calculated based on an output value of the sensor by subtracting an amount of rise of a NOx purification rate calculated based on the amount of decline in output from the NOx purification rate.

6. The abnormality diagnosis apparatus for the exhaust gas purification apparatus according to claim 4, wherein the NOx concentration estimating unit is configured to estimate a NOx concentration in exhaust gas that flows out from the selective catalytic reduction NOx catalyst when assuming that the selective catalytic reduction NOx catalyst is in an abnormal state, the ammonia concentration estimating unit is configured to estimate an ammonia concentration in the exhaust gas that flows out from the selective catalytic reduction NOx catalyst when assuming that the selective catalytic reduction NOx catalyst is in an abnormal state, the calculating unit is configured to calculate the amount of decline in output when assuming that the selective catalytic reduction NOx catalyst is in an abnormal state based on the NOx concentration and the ammonia concentration in the exhaust gas that flows out from the selective catalytic reduction NOx catalyst when assuming that the selective catalytic reduction NOx catalyst is in an abnormal state, and the diagnosis control unit is configured to correct the threshold by adding, to the threshold, an amount of rise of a NOx purification rate calculated based on the amount of decline in output when assuming that the selective catalytic reduction NOx catalyst is in an abnormal state.

7. The abnormality diagnosis apparatus for the exhaust gas purification apparatus according to claim 4, wherein the NOx concentration estimating unit is configured to estimate a NOx concentration in exhaust gas that flows out from the selective catalytic reduction NOx catalyst when assuming that the selective catalytic reduction NOx catalyst is in a normal state, and a NOx concentration in exhaust gas that flows out from the selective catalytic reduction NOx catalyst when assuming that the selective catalytic reduction NOx catalyst is in an abnormal state, the ammonia concentration estimating unit is configured to estimate an ammonia concentration in the exhaust gas that flows out from the selective catalytic reduction NOx catalyst when assuming that the selective catalytic reduction NOx catalyst is in a normal state, and an ammonia concentration in the exhaust gas that flows out from the selective catalytic reduction NOx catalyst when assuming that the selective catalytic reduction NOx catalyst is in an abnormal state, the calculating unit is configured to calculate the amount of decline in output when assuming that the selective catalytic reduction NOx catalyst is in a normal state based on the NOx concentration and the ammonia concentration in the exhaust gas that flows out from the selective catalytic reduction NOx catalyst when assuming that the selective catalytic reduction NOx catalyst is in a normal state and, at the same time, calculate the amount of decline in output when assuming that the selective catalytic reduction NOx catalyst is in an abnormal state based on the NOx concentration and the ammonia concentration in the exhaust gas that flows out from the selective catalytic reduction NOx catalyst when assuming that the selective catalytic reduction NOx catalyst is in an abnormal state, and the diagnosis control unit is configured to correct the threshold by adding, to the threshold, a value which is equal to or larger than an amount of rise of a NOx purification rate calculated based on the amount of decline in output when assuming that the selective catalytic reduction NOx catalyst is in an abnormal state and, at the same time, which is equal to or smaller than a sum value of the amount of rise of a NOx purification rate calculated based on the amount of decline in output when assuming that the selective catalytic reduction NOx catalyst is in an abnormal state and the amount of rise of a NOx purification rate calculated based on the amount of decline in output when assuming that the selective catalytic reduction NOx catalyst is in a normal state.

8. The abnormality diagnosis apparatus for the exhaust gas purification apparatus according to claim 1, wherein the diagnosis control unit is configured to:

make the diagnosing unit perform an abnormality diagnosis of the selective catalytic reduction NOx catalyst when an amount of decline in output of the sensor as calculated by the calculating unit is equal to or smaller than a prescribed amount; and make the diagnosing unit not perform an abnormality diagnosis of the selective catalytic reduction NOx catalyst when the amount of decline in output of the sensor as calculated by the calculating unit is larger than the prescribed amount.

9. The abnormality diagnosis apparatus for the exhaust gas purification apparatus according to claim 1, wherein the diagnosing unit is configured to:

diagnose that the selective catalytic reduction NOx catalyst is in a normal state when an output value of the sensor is equal to or smaller than a threshold; and diagnose that the selective catalytic reduction NOx catalyst is in an abnormal state when the output value of the sensor is larger than the threshold, and the diagnosis control unit is configured to correct the threshold or the output value of the sensor based on the amount of decline in output of the sensor as calculated by the calculating unit.

10. The abnormality diagnosis apparatus for the exhaust gas purification apparatus according to claim 9, wherein the diagnosis control unit is configured to correct the threshold by subtracting the amount of decline in output from the threshold.

11. The abnormality diagnosis apparatus for the exhaust gas purification apparatus according to claim 9, wherein the diagnosis control unit is configured to correct the output value of the sensor by adding the amount of decline in output to the output value of the sensor.

12. The abnormality diagnosis apparatus for the exhaust gas purification apparatus according to claim 10, wherein
the NOx concentration estimating unit is configured to estimate a NOx concentration in exhaust gas that flows out from the selective catalytic reduction NOx catalyst when assuming that the selective catalytic reduction NOx catalyst is in an abnormal state,
the ammonia concentration estimating unit is configured to estimate an ammonia concentration in the exhaust gas that flows out from the selective catalytic reduction NOx catalyst when assuming that the selective catalytic reduction NOx catalyst is in an abnormal state,
the calculating unit is configured to calculate the amount of decline in output when assuming that the selective catalytic reduction NOx catalyst is in an abnormal state based on the NOx concentration and the ammonia concentration in the exhaust gas that flows out from the selective catalytic reduction NOx catalyst when assuming that the selective catalytic reduction NOx catalyst is in an abnormal state, and
the diagnosis control unit is configured to correct the threshold by subtracting the amount of decline in output when assuming that the selective catalytic reduction NOx catalyst is in an abnormal state from the threshold.

13. The abnormality diagnosis apparatus for the exhaust gas purification apparatus according to claim 10, wherein
the NOx concentration estimating unit is configured to estimate a NOx concentration in exhaust gas that flows out from the selective catalytic reduction NOx catalyst when assuming that the selective catalytic reduction NOx catalyst is in a normal state, and a NOx concentration in exhaust gas that flows out from the selective catalytic reduction NOx catalyst when assuming that the selective catalytic reduction NOx catalyst is in an abnormal state,
the ammonia concentration estimating unit is configured to estimate an ammonia concentration in the exhaust gas that flows out from the selective catalytic reduction NOx catalyst when assuming that the selective catalytic reduction NOx catalyst is in a normal state, and an ammonia concentration in the exhaust gas that flows out from the selective catalytic reduction NOx catalyst when assuming that the selective catalytic reduction NOx catalyst is in an abnormal state,
the calculating unit is configured to calculate the amount of decline in output when assuming that the selective catalytic reduction NOx catalyst is in a normal state based on the NOx concentration and the ammonia concentration in the exhaust gas that flows out from the selective catalytic reduction NOx catalyst when assuming that the selective catalytic reduction NOx catalyst is in a normal state and, at the same time, calculate the amount of decline in output when assuming that the selective catalytic reduction NOx catalyst is in an abnormal state based on the NOx concentration and the ammonia concentration in the exhaust gas that flows out from the selective catalytic reduction NOx catalyst when assuming that the selective catalytic reduction NOx catalyst is in an abnormal state, and
the diagnosis control unit is configured to correct the threshold by subtracting, from the threshold, a value which is equal to or larger than the amount of decline in output when assuming that the selective catalytic reduction NOx catalyst is in an abnormal state and, at the same time, which is equal to or smaller than a sum value of the amount of decline in output when assuming that the selective catalytic reduction NOx catalyst is in an abnormal state and the amount of decline in output when assuming that the selective catalytic reduction NOx catalyst is in a normal state.

14. The abnormality diagnosis apparatus for the exhaust gas purification apparatus according to claim 1, wherein the diagnosing unit is configured to perform an abnormality diagnosis when ammonia or an ammonia precursor is being supplied from the supplying unit.

15. The abnormality diagnosis apparatus for the exhaust gas purification apparatus according to claim 14, wherein a supply amount of ammonia or an ammonia precursor by the supplying unit is increased when an abnormality diagnosis is performed by the diagnosing unit as compared to when an abnormality diagnosis is not performed by the diagnosing unit.

* * * * *